US010681576B2

(12) United States Patent
Gheorghiu et al.

(10) Patent No.: US 10,681,576 B2
(45) Date of Patent: Jun. 9, 2020

(54) MEASUREMENT GAP ENHANCEMENTS

(71) Applicant: QUALCOMM Incorporated, San Diego, CA (US)

(72) Inventors: Valentin Alexandru Gheorghiu, Tokyo (JP); Amir Aminzadeh Gohari, Sunnyvale, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 15/095,857

(22) Filed: Apr. 11, 2016

(65) Prior Publication Data

US 2016/0302098 A1 Oct. 13, 2016

Related U.S. Application Data

(60) Provisional application No. 62/146,875, filed on Apr. 13, 2015.

(51) Int. Cl.
*H04W 24/10* (2009.01)
*H04W 72/08* (2009.01)
(Continued)

(52) U.S. Cl.
CPC ....... *H04W 24/10* (2013.01); *H04W 36/0088* (2013.01); *H04W 56/001* (2013.01);
(Continued)

(58) Field of Classification Search
CPC combination set(s) only.
See application file for complete search history.

(56) References Cited

U.S. PATENT DOCUMENTS

2010/0142487 A1  6/2010  Kim
2012/0307670 A1* 12/2012  Kazmi ................. H04W 24/10
                                                           370/252

(Continued)

FOREIGN PATENT DOCUMENTS

WO  WO-2006107966 A1  10/2006
WO  WO-2012100200 A2   7/2012
(Continued)

OTHER PUBLICATIONS

ISA/EP, International Search Report and Written Opinion of the International Searching Authority, Int'l. App. No. PCT/US2016/027097, dated Aug. 12, 2016, European Patent Office, Rijswijk, NL, 23 pgs.

(Continued)

*Primary Examiner* — Yee F Lam
(74) *Attorney, Agent, or Firm* — Holland & Hart LLP

(57) ABSTRACT

Methods, systems, and devices for wireless communication are described. A user equipment (UE) may receive a measurement configuration on a first cell specifying a measurement gap for measuring cells on other frequencies. The UE may then measure a second cell and determine an offset between the timing of the two cells. If the measured frequency band is synchronized (or nearly synchronized), the length of the measurement gap may be reduced. In some cases, the UE may then make measurements on the second cell using a reduced measurement interval, and the UE may power down certain components during the rest of the measurement gap to conserve power. In other cases, the UE may coordinate with the serving cell to reduce the measurement gap to minimize the interruption caused by the gaps.

40 Claims, 17 Drawing Sheets

(51) Int. Cl.
*H04W 72/04* (2009.01)
*H04W 56/00* (2009.01)
*H04W 36/00* (2009.01)
*H04W 88/02* (2009.01)

(52) U.S. Cl.
CPC ..... *H04W 72/0453* (2013.01); *H04W 72/085* (2013.01); *H04W 36/0094* (2013.01); *H04W 56/005* (2013.01); *H04W 56/0015* (2013.01); *H04W 88/02* (2013.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(56) References Cited

U.S. PATENT DOCUMENTS

| | | | | |
|---|---|---|---|---|
| 2013/0017841 A1* | 1/2013 | Kazmi | ............ | G01S 5/0236 455/456.1 |
| 2015/0201338 A1* | 7/2015 | Gopal | ............ | H04W 36/0088 370/252 |
| 2015/0327249 A1* | 11/2015 | Kitazoe | ............ | H04W 56/005 370/329 |
| 2015/0358855 A1* | 12/2015 | Yang | ............ | H04B 17/345 370/252 |
| 2016/0014706 A1* | 1/2016 | Vajapeyam | ............ | H04W 56/001 370/328 |
| 2017/0201987 A1* | 7/2017 | Huang | ............ | H04W 16/32 |
| 2018/0062776 A1* | 3/2018 | Teshima | ............ | H04W 52/02 |

FOREIGN PATENT DOCUMENTS

| | | | |
|---|---|---|---|
| WO | WO-2012171215 A1 | 12/2012 | |
| WO | WO-2014112716 A1 * | 7/2014 | ........... H04B 17/345 |

OTHER PUBLICATIONS

IPEA/EP, Second Written Opinion of the International Preliminary Examining Authority, Int'l Application No. PCT/US2016/027097, dated Mar. 10, 2017, European Patent Office, Munich, DE, 14 pgs.

ISA/EPO, Partial International Search Report of the International Searching Authority, Int'l. App. No. PCT/US2016/027097, dated Jun. 20, 2016, European Patent Office, Rijswijk, NL, 8 pgs.

Taiwan Search Report—TW105111360—TIPO—dated Feb. 6, 2020.

* cited by examiner

MEASUREMENT GAP ENHANCEMENTS

CROSS REFERENCES

The present application for patent claims priority to U.S. Provisional Patent Application No. 62/146,875 by Gheorghiu, et al., entitled "Measurement Gap Enhancements," filed Apr. 13, 2015, assigned to the assignee hereof.

BACKGROUND

The following relates generally to wireless communication, and more specifically to measurement gap enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A UE and a base station may refrain from communicating with one another for a short period known as a measurement gap, which may enable the UE to make measurements on neighboring cells. In some cases, the measurement gap may be longer than the time the UE uses to make the measurements; this excess time may account for differences in timing between cells.

SUMMARY

A user equipment (UE) may receive a measurement configuration on a first cell specifying a measurement gap for measuring cells on other frequencies. The UE may then measure a second cell and determine an offset between the timing of the two cells. Using the timing offset, the length of the measurement gap may be reduced. Likewise, a reduced measurement gap may be used to measure two or more cells in a same frequency band if their subframe timing is synchronized. In some cases, the UE may then make measurements on the second cell using a reduced measurement interval. The UE may power down various components or modules during the rest of the measurement gap to conserve power. Additionally or alternatively, the UE may coordinate with the serving cell to reduce the measurement gap to minimize the interruption caused by the gaps.

A method of wireless communication is described. The method may include receiving a measurement configuration on a first cell in a first frequency band, where the measurement configuration may include a first measurement gap for measuring cells in frequency bands different from the first frequency band, measuring a second cell in the second frequency band during a first measurement interval, where the first measurement interval may be based at least in part on the first measurement gap, identifying a timing offset between the first cell the second cell based at least in part on monitoring the second cell, and determining a second measurement interval for the second frequency band based at least in part on the timing offset.

An apparatus for wireless communication is described. The apparatus may include means for receiving a measurement configuration on a first cell in a first frequency band, where the measurement configuration may include a first measurement gap for measuring cells in frequency bands different from the first frequency band, means for measuring a second cell in the second frequency band during a first measurement interval, where the first measurement interval may be based at least in part on the first measurement gap, means for identifying a timing offset between the first cell the second cell based at least in part on monitoring the second cell, and means for determining a second measurement interval for the second frequency band based at least in part on the timing offset.

A further apparatus for wireless communication is described. The apparatus may include a processor, memory in electronic communication with the processor, and instructions stored in the memory and operable, when executed by the processor, to cause the apparatus to receive a measurement configuration on a first cell in a first frequency band, where the measurement configuration may include a first measurement gap for measuring cells in frequency bands different from the first frequency band, measure a second cell in the second frequency band during a first measurement interval, where the first measurement interval may be based at least in part on the first measurement gap, identify a timing offset between the first cell the second cell based at least in part on monitoring the second cell, and determine a second measurement interval for the second frequency band based at least in part on the timing offset.

A non-transitory computer-readable medium storing code for wireless communication is described. The code may include instructions executable to receive a measurement configuration on a first cell in a first frequency band, where the measurement configuration comprises a first measurement gap for measuring cells in frequency bands different from the first frequency band, measure a second cell in the second frequency band during a first measurement interval, where the first measurement interval may be based at least in part on the first measurement gap, identify a timing offset between the first cell the second cell based at least in part on monitoring the second cell, and determine a second measurement interval for the second frequency band based at least in part on the timing offset.

In some examples of the method, apparatuses, or non-transitory computer-readable medium described herein, the second measurement interval has a shorter duration than the first measurement interval. Additionally or alternatively, some examples may include processes, features, means, or instructions for determining that a subframe timing of two or more cells in the second frequency band is synchronized and measuring each of the two or more cells in the second measurement interval.

Some examples of the method, apparatuses, or non-transitory computer-readable medium described herein may further include processes, features, means, or instructions for receiving an indication from the first cell that a subframe timing of two or more cells in the second frequency band is synchronized and measuring each of the two or more cells in the second measurement interval. Additionally or alternatively, in some examples, measuring the second cell may include identifying one or more measurement subframes of the second cell comprising a synchronization signal, a reference signal, or both.

In some examples of the method, apparatuses, or non-transitory computer-readable medium described herein, the timing offset comprises a difference between a timing of the one or more measurement subframes of the second cell and one or more measurement subframes of the first cell. Additionally or alternatively, some examples may include processes, features, means, or instructions for transmitting a measurement report to the first cell based at least in part on the measurement configuration, where the measurement report may include the timing offset, receiving a modified measurement configuration from the first cell, where the modified measurement configuration may include a second measurement gap and the second measurement interval may be based at least in part on the reduced measurement gap, and measuring the second cell during the second measurement interval based at least in part on the modified measurement configuration. Additionally or alternatively, some examples may include transmitting an indication of the timing offset to the first cell.

Some examples of the method, apparatuses, or non-transitory computer-readable medium described herein may further include processes, features, means, or instructions for measuring the second cell during the second measurement interval based at least in part on the first measurement gap, where a duration of the second measurement interval may be less than a duration of the first measurement gap. Some examples may further include processes, features, means, or instructions for powering down a radio component during a portion of the duration of the first measurement gap.

A further method of wireless communication is described. The method may include determining an inter-frequency measurement configuration for a user equipment (UE), wherein the inter-frequency measurement configuration may include a first measurement gap for measuring cells in frequency bands different from a first frequency band of a first cell, transmitting an indication of the measurement configuration to the UE, receiving a timing offset for a second cell in a second frequency band in relation to the first cell in the first frequency band, determining a second measurement gap for the wireless device based at least in part on the received timing offset, and transmitting an indication of the second measurement gap to the UE.

A further apparatus for wireless communication is described. The apparatus may include means for determining an inter-frequency measurement configuration for a user equipment (UE), wherein the inter-frequency measurement configuration may include a first measurement gap for measuring cells in frequency bands different from a first frequency band of a first cell, means for transmitting an indication of the measurement configuration to the UE, means for receiving a timing offset for a second cell in a second frequency band in relation to the first cell in the first frequency band, means for determining a second measurement gap for the wireless device based at least in part on the received timing offset, and means for transmitting an indication of the second measurement gap to the UE.

A further apparatus for wireless communication is described. The apparatus may include a processor, memory in electronic communication with the processor, and instructions stored in the memory and operable, when executed by the processor, to cause the apparatus to determine an inter-frequency measurement configuration for a user equipment (UE), wherein the inter-frequency measurement configuration may include a first measurement gap for measuring cells in frequency bands different from a first frequency band of a first cell, transmit an indication of the measurement configuration to the UE, receive a timing offset for a second cell in a second frequency band in relation to the first cell in the first frequency band, determine a second measurement gap for the wireless device based at least in part on the received timing offset, and transmit an indication of the second measurement gap to the UE.

A further non-transitory computer-readable medium storing code for wireless communication is described. The code may include instructions executable to determine an inter-frequency measurement configuration for a user equipment (UE), wherein the inter-frequency measurement configuration may include a first measurement gap for measuring cells in frequency bands different from a first frequency band of a first cell, transmit an indication of the measurement configuration to the UE, receive a timing offset for a second cell in a second frequency band in relation to the first cell in the first frequency band, determine a second measurement gap for the wireless device based at least in part on the received timing offset, and transmit an indication of the second measurement gap to the UE.

Some examples of the method, apparatuses, or non-transitory computer-readable medium described herein may further include processes, features, means, or instructions for the indication of the second measurement gap to be used to determine a measurement configuration for more than UE. Additionally or alternatively, some examples may include processes, features, means, or instructions for refraining from transmitting to one or more UEs for a duration based at least in part on the second measurement gap. Additionally or alternatively, some examples may include processes, features, means, or instructions for receiving a second timing offset, wherein the second measurement gap may be based at least in part on the second timing offset.

BRIEF DESCRIPTION OF THE DRAWINGS

Aspects of the disclosure are described in reference to the following figures.

DETAILED DESCRIPTION

Figure 1:
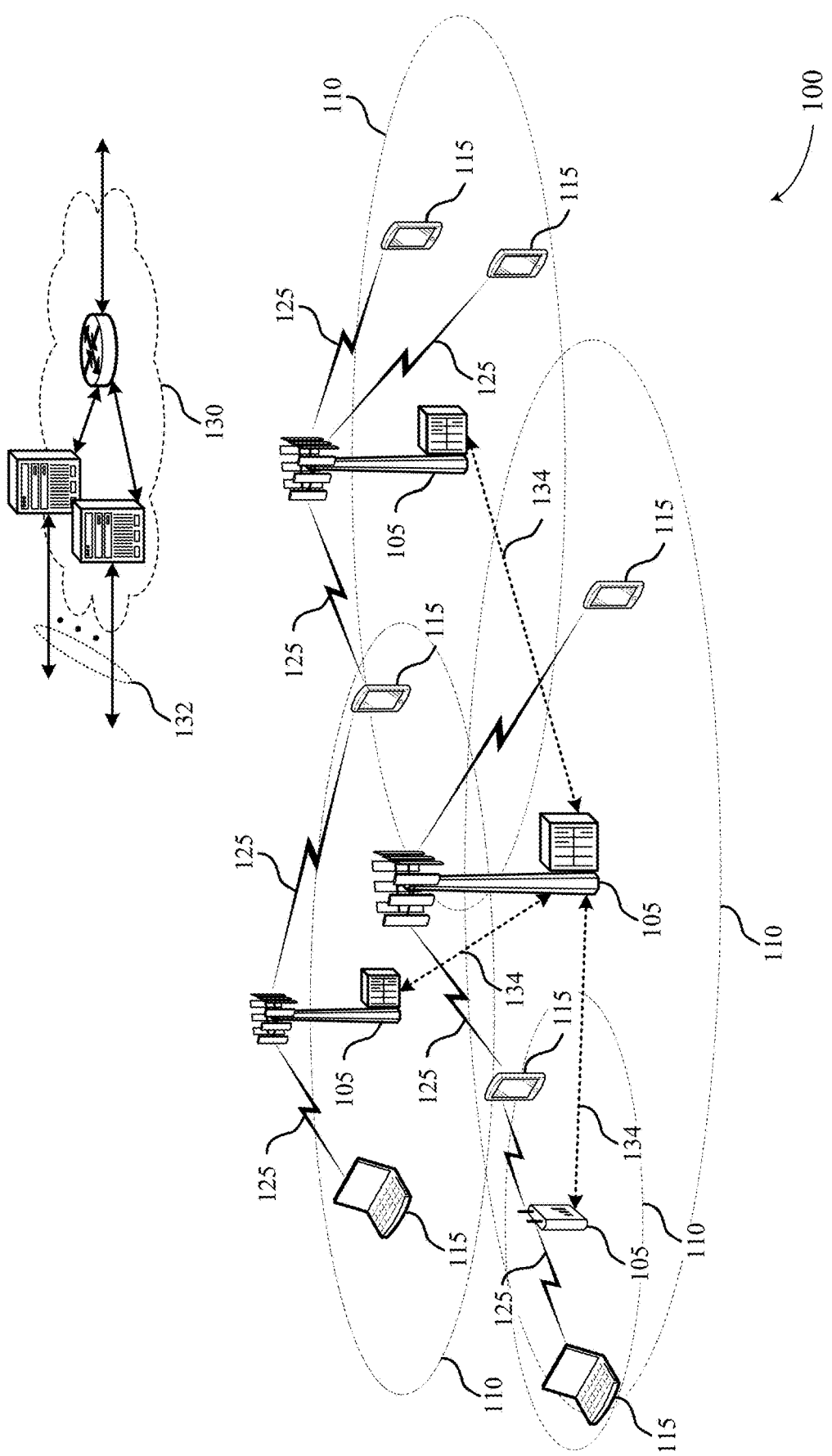
FIG. 1 illustrates an exemplary wireless communications system that supports measurement gap enhancements in accordance with various aspects of the present disclosure.

In order for a user equipment (UE) to maintain connectivity and to facilitate UE mobility, the UE may sometimes switch to different frequencies to monitor channel quality. For example, this may be useful in places where coverage is different on different frequencies or for load balancing purposes. Likewise, a UE may monitor different transmission of different radio access technologies (RATs), which may occur on different frequencies. As such, the UE may perform measurements on the different frequencies by stopping its monitoring on the serving cell and retuning to another frequency during measurement gaps—e.g., periods of time in which the UE is allowed to or expected to tune elements of its receiver to frequencies other than that of the serving cell. In some cases, a measurement gap may be referred to as a search window. During these measurement gaps, the UE may receive a primary synchronization signal (PSS), a secondary synchronization signal (SSS), and cell-specific reference (CRS) signals of other cells to allow the UE to discover those cell discovery and conduct signal strength measurements (e.g., reference signal received power (RSRP) or other measures).

In some cases, the inter-frequency measurement gaps have a length determined or configured such that one instance of PSS and SSS and 1 or 2 subframes with CRS are available for measurements (e.g., a 5 ms gap). That is, a measurement gap may have a specified duration that is determined in an effort to increase the likelihood that the UE will be able to receive PSS, SSS, and CRS of other cells during the measurement gap. During this measurement gap the UE may tune away from the serving cell and may thus not monitor the frequency band of the serving cell. This gap in monitoring of the serving cell may result in a loss in throughput to the UE. In some cases, however, the measurements of other cells could be done in just 1 or 2 subframes, and thus would not necessitate a 5 ms measurement gap. In other words, if the UE knew the timing of the frequency band to be measured during the measurement gap in advance of tuning (e.g., if the network is synchronized), the UE may utilize a shorter duration gap, or at least power down components for excess or unnecessary portions of the measurement gap.

Measurement gaps may be configured by the network and may occur at a precise moment in time. In some cases, a default measurement gap may be configured based on the assumption that the network is asynchronous (that is, that the measurement subframes are not aligned at all base stations). If the base stations on certain frequencies are synchronized, then a shorter gap (e.g., 1 ms or 2 ms) could be used. This shorter gap length may represent an optimized gap length in certain scenarios. The network may configure the gaps to occur at a certain time such that measurement subframes are within the gaps. In some cases, however, the network does not have the information to determine where these measurement subframes are.

In order to allow a UE to make use of shorter measurement gaps, or shorter duration measurements during measurement gaps. A UE may, for example, inform the network of a frequency offset for a certain frequency band after an initial measurement during a default measurement gap. The network could then configure a gap pattern that is reduced with respect to the default gap based on the report from the UE. In some cases, the UE could switch independently to the reduce gap after a few gaps, or it may change autonomously and then inform the network. In some cases, the network may inform the UE if the frequency where it is to perform measurements is synchronous or not. Based on this information, the UE may use the longer gap pattern but shut down (e.g., power down) the receiver outside the measurement subframes to save power.

Aspects of the disclosure are described below in the context of an exemplary wireless communication system. Specific examples are then described for subframe timing offsets. These and other aspects of the disclosure are further illustrated by and described with reference to apparatus diagrams, system diagrams, and flowcharts that relate to measurement gap enhancements.

FIG. 1 illustrates an exemplary wireless communications system 100 that supports measurement gap enhancements in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may support enhanced measurement gaps to enable UEs 115 to make measurements on neighboring base stations 105 with reduced overhead.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, a UE 115 may tune away from a serving cell in order to detect the PSS, SSS, or other signals from neighboring cells.

Some systems, such as time division duplex (TDD) systems, may transmit an SSS but not a PSS, while other systems may transmit both PSS and SSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring.

In addition to PSS and SSS, a base station 105 may also insert periodic pilot symbols, such as cell-specific reference signals (CRS), to aid UEs 115 in channel estimation and coherent demodulation. CRS may include one of 504 different cell identities. These CRS may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, demodulation reference signals (DMRS), which may also be referred to as UE-specific reference signals (UERS), may be directed toward specific UEs 115 and may be transmitted only on resource blocks assigned to those UEs 115.

After accessing the network, a UE 115 may establish a communication link 125. A communication link 125 may include one or more frequency ranges organized into carriers. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the Long Term Evolution (LTE) standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for downlink (DL) may be referred to as a DL CC, and a carrier used for uplink (UL) may be referred to as an UL CC. A UE 115 may be configured with multiple DL component carriers (CCs) and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers.

Each cell of a base station 105 may include an UL component carrier (CC) and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK) or negative acknowledgement (NACK), channel quality indicator (CQI), and scheduling information transmitted on physical uplink control channel (PUCCH), may be carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In other cases, one or more secondary cell (SCells) may be designated to carry PUCCH, and the SCells may be organized into PUCCH groups based on which CC is used to carry the associated UL control information. Some wireless networks may utilize enhanced CA operations based on a large number of carriers (e.g., between 5 and 32 carriers), operation in unlicensed spectrum, or use of enhanced CCs.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment groups (TAGs). Each TAG may be associated with a different timing offset, such that the UE 115 may synchronize UL transmissions differently for different UL carriers.

A base station 105 may provide a UE 115 with a measurement reporting configuration as part of an RRC configuration. The measurement reporting configuration may include parameters related to which neighbor cells and frequencies the UE 115 should measure, criteria for sending measurement reports, intervals for transmission of measurement reports (e.g., measurement gaps), and other related information. In some cases, measurement reports may be triggered by events related to the channel conditions of the serving cells or the neighbor cells. In some cases, the UE 115 may wait for a timer interval known as time-to-trigger (TTT) to verify that the trigger condition persists before sending the report. Other reports may be sent periodically instead of being based on a trigger condition (e.g., every two seconds a UE 115 may transmit an indication of a transport block error rate). A measurement reporting configuration may also include a measurement gap configuration so that if UE 115 tunes to another frequency to make a measurement it may not miss any packets from the serving cell.

Thus, a UE 115 may receive a measurement configuration from a cell of a base station 105 specifying a measurement gap for measuring cells on other frequencies. The UE 115 may then measure a second cell and determine an offset between the timing of the two cells. If the measured frequency band is synchronized, the length of the measurement gap may be reduced. In some cases, the UE 115 may then make measurements on the second cell using a reduced measurement interval and power down during the rest of the measurement gap to conserve power. In other cases, the UE 115 may coordinate with the serving cell to reduce the measurement gap to minimize the interruption caused by the gaps.

Figure 2:
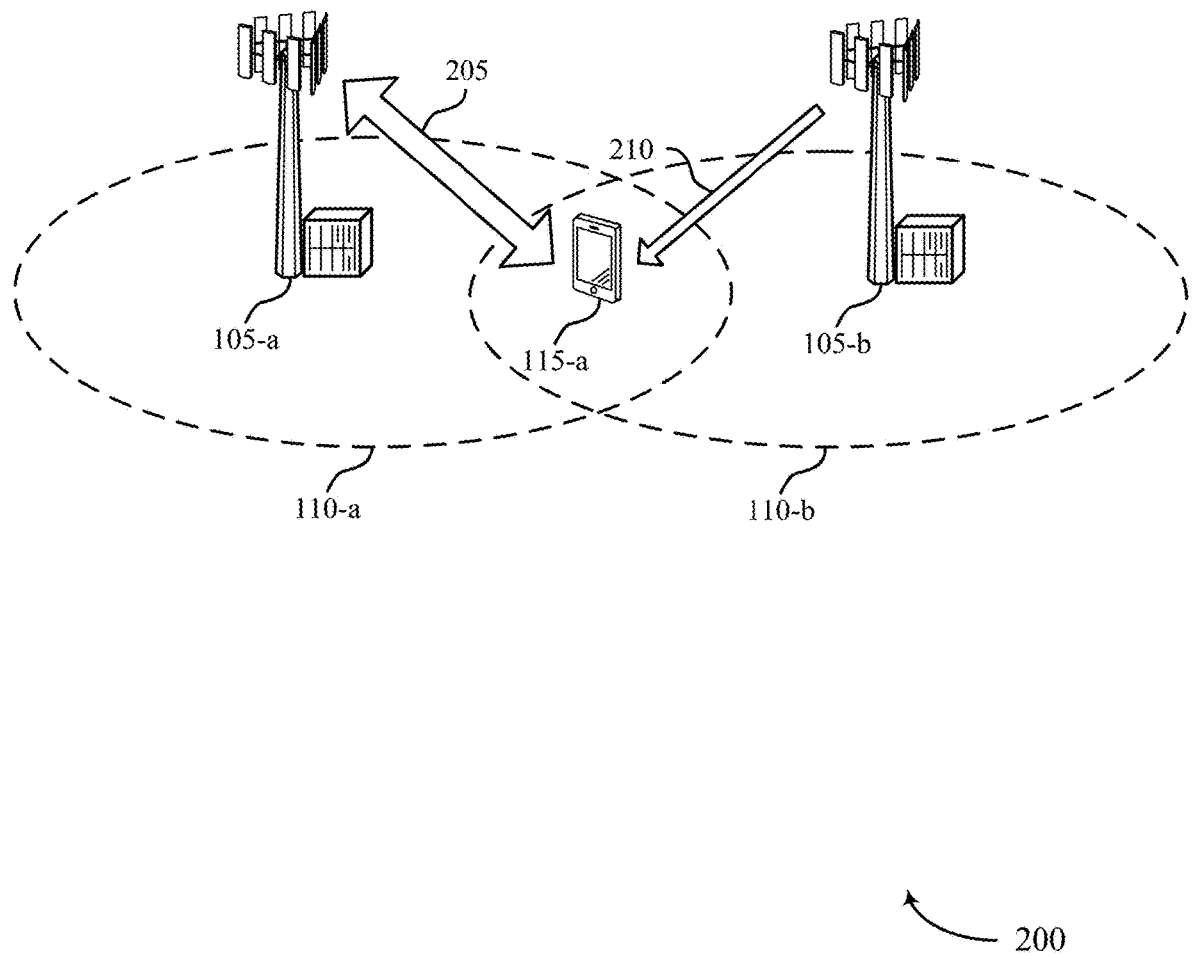
FIG. 2 illustrates an exemplary wireless communications system that supports measurement gap enhancements in accordance with various aspects of the present disclosure.

FIG. 2 illustrates an example of a wireless communications system 200 for measurement gap enhancements in accordance with various aspects of the present disclosure. Specifically, wireless communications system 200 may include a UE 115-a, which may tune away from a serving cell 205 on base station 105-a to measure PSS, SSS, CRS, or other signals transmitted by base station 105-b. UE 115-a, base station 105-a and base station 105-b may be examples of corresponding devices described with reference to FIG. 1.

UE 115-a may communicate with base station 105-a via serving cell 205, but may also be in range of neighboring cell 210. In order for a UE 115-a to maintain connectivity or support mobility operations, it may occasionally tune away from serving cell 205 to neighboring cell 210 (which may use a different frequency band) to monitor channel quality. As such, UE 115-a may perform measurements on neighboring cell 210 by stopping monitoring serving cell 205 during measurement gaps. The gaps may be timed to enable UE 115-a to receive PSS, SSS, and CRS signals to enable cell discovery and receive signal strength measurements (e.g., RSRP) from neighboring cell 210.

In some cases, the inter-frequency measurement gaps (e.g., search windows) may have a length of 5 ms or more, such that one instance of PSS and SSS and 1 or 2 subframes with CRS are available for measurements. During this measurement gap, UE 115-a may not monitor serving cell 205. This may result in a loss in throughput. But in some cases the measurements could be done in a shorter duration (e.g., 1 or 2 subframes) if UE 115-a was aware of the timing of neighboring cell 210 (e.g., if the network of the neighboring cell is synchronized or near-synchronized, if an offset for measurement subframes were known, etc.) in advance of undertaking the measurement. UE 115-a could also use a minimized or reduced duration gap to save power if it knew the synchronization information for neighboring cell 210.

The default measurement gap may be configured based on the assumption that serving cell 205 and neighboring cell 210 are asynchronous—e.g., an assumption of the network that the measurement subframes are not aligned at all base stations. As such, UE 115-a may measure the entire 5 ms to increase the likelihood it will find the subframes containing the proper signals for measurements.

The measurement gaps may be configured by the network and may occur at a precise moment in time. In some cases, if base station 105-b is synchronized with other base station (or cells) operating at the same frequency, then a reduce duration gap (e.g., 1 ms or 2 ms) may be used. Serving cell 205 may configure the measurement gaps to occur at a certain time such that measurement subframes are within the gaps. In some cases, however, the network does not have the information on where these subframes are relative to the timing of serving cell 205.

UE 115-a may inform the network of a timing offset for neighboring cell 210 after performing an initial measurement during a default measurement gap. Serving cell 205 could then configure a reduced gap pattern, which may represent a preferable or optimized gap pattern, based on the report from UE 115-a. In some examples, the network may receive measure reports and timing offsets from several UEs 115. Because timing differences between cells may change slowly (e.g., timing between cells may drift little over the course of hours or days), the network may utilize timing offsets from one UE 115 to configure another UE 115. In some cases, UE 115-a may switch independently to the reduced gap after a few gaps or change autonomously and then inform the network. In some cases, the serving cell 205 may inform UE 115-a if serving cell 205 and neighboring cell 210 are synchronous or not. Based on this information, UE 115-a may use the longer gap pattern but shut down certain radio components outside the measurement subframes to save power.

Figure 3A:
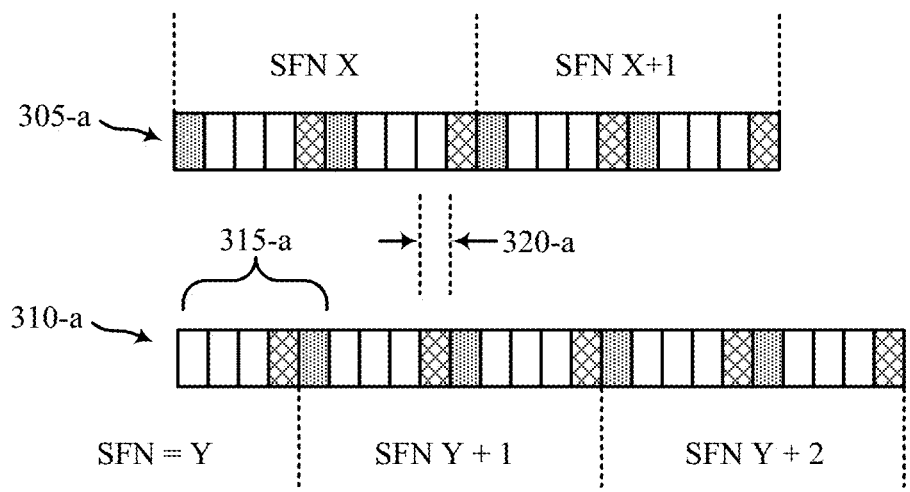
FIGS. 3A and 3B illustrate exemplary subframe timing for measurement gap enhancements in accordance with various aspects of the present disclosure.

FIG. 3A illustrates exemplary subframe timing 300-a for measurement gap enhancements in accordance with various aspects of the present disclosure. Subframe timing 300-a may represent asynchronous subframe timing for measurement cells in a same frequency band.

Subframe timing 300-a may include a first timing configuration 305-a for a first cell of a frequency band to be measured with system frame numbers (SFN) X and X+1. Subframe timing 300-a may also include a second timing configuration 310-a for a second cell on the frequency band with SFNs Y, Y+1 and Y+2. First timing configuration 305-a and second timing configuration 310-a may include subframes for transmitting PSS and SSS, which may be designed to repeat every 5 ms (e.g., during subframes 0 and 5). CRS may also be repeated on select subframes (e.g., 0, 4, 5, and 9). Thus, subframes 0 and 5 may include PSS, SSS and CRS, whereas subframes 4 and 9 may include CRS. First timing configuration 305-a and second timing configuration 310-a may not be aligned. That is, the starting points for each frame or subframe may be different.

If a UE 115 or the serving cell is not aware of (e.g., has not conducted measurements or received signaling regarding) first timing configuration 305-a or second timing configuration 310-a, a measurement gap 315-a may be configured based on a default scenario or assumption to increase the likelihood that a measurement subframe, which may be defined as a subframe that includes PSS, SSS, CRS, or some other measured signal, of second timing configuration 310-a is included within measurement gap 315-a.

In some cases, a UE 115 may measure a first offset relating first timing configuration 305-a to the timing of the serving cell, and a second offset relating second timing configuration 310-a to the timing of the serving cell. In other cases, an offset between first timing configuration 305-a and second timing configuration 310-a may be measured, and if the offset is non-zero or greater than a threshold, the measured frequency band may be considered asynchronous. The offset may be identified (e.g., measured, determined, etc.) by, for example, comparing measurement subframes of the first timing configuration 305-a and the second timing configuration 310-a. That is, a UE 115 may determine a time difference, which may be referred to as an offset 320-a, between a subframe when PSS, SSS, or CRS or occur in the first timing configuration 305-a and the second timing configuration 310-a, and the UE 115 may report this offset to the network via a serving cell.

Figure 3B:
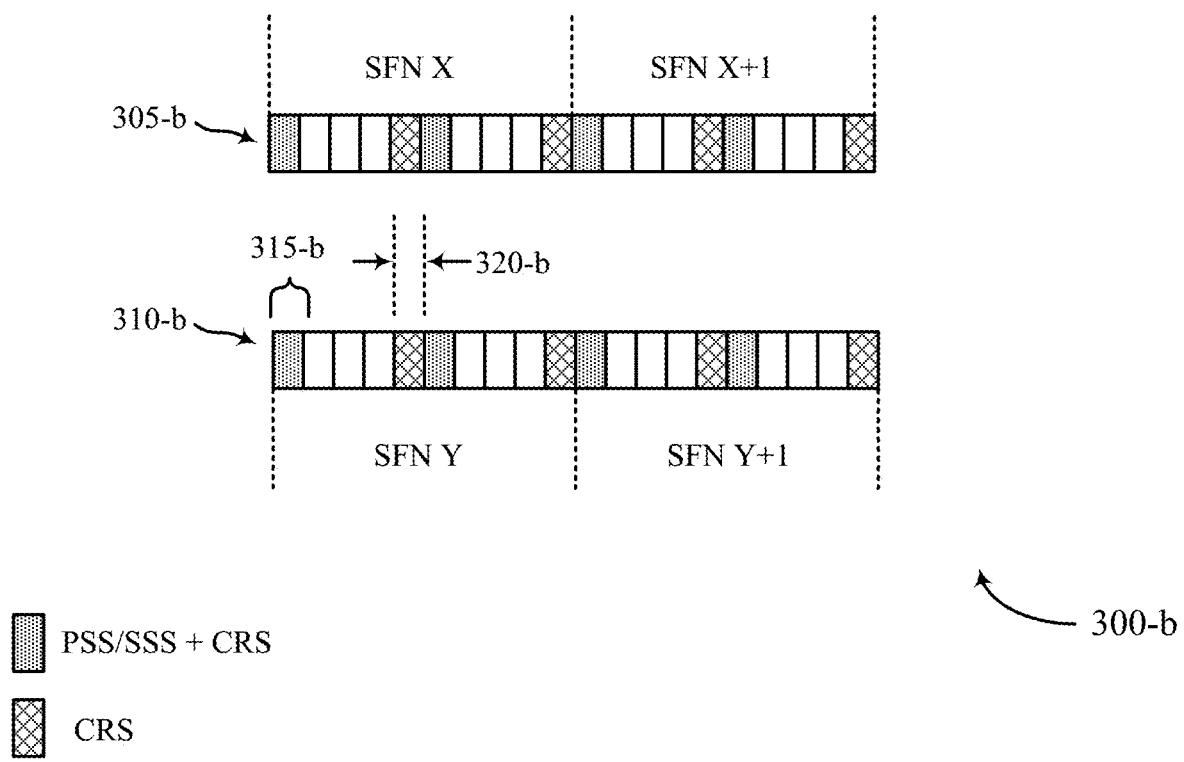

FIG. 3B illustrates an exemplary subframe timing 300-b for measurement gap enhancements in accordance with various aspects of the present disclosure. Subframe timing 300-b may represent a synchronous subframe timing configuration for measurement cells in a same frequency band.

Subframe timing 300-b may include a first timing configuration 305-b for a first cell of a measured frequency with system frame numbers (SFN) X and X+1. Subframe timing 300-b may also include a second timing configuration 310-b for a second cell on the measured frequency with SFNs Y and Y+1. First timing configuration 305-b and second timing configuration 310-*b* may include subframes for transmitting PSS and SSS, which may be designed to repeat every 5 ms (e.g., during subframes 0 and 5). CRS may also be repeated on select subframes (e.g., 0, 4, 5, and 9). Thus, subframes 0 and 5 may include PSS, SSS and CRS, whereas subframes 4 and 9 may include CRS.

If a UE 115 or the serving cell is aware of first timing configuration 305-*b* and second timing configuration 310-*b*, a measurement gap 315-*b* may be configured based on the synchronized timing such that a measurement gap 315-*b* covering a single subframe includes PSS, SSS, and CRS. In some cases, a synchronous network (or nearly synchronous network) may configure a measurement gap 315-*b* including two or more subframes (not shown). For example, measurement gap 315-*b* may be configured to include one subframe with PSS, SSS, and CRS and another subframe with CRS.

In some cases, a UE 115 may measure a first offset relating first timing configuration 305-*b* to the timing of the serving cell, and a second offset relating second timing configuration 310-*b* to the timing of the serving cell. If the offsets are the same (or nearly the same), the measured frequency band may be synchronous. In other cases, an offset between first timing configuration 305-*b* and second timing configuration 310-*b* may be measured, and if the offset is zero or close to zero, the measured frequency band may be synchronous. The offset may be identified (e.g., measured, determined, etc.) by, for example, comparing measurement subframes of the first timing configuration 305-*b* and the second timing configuration 310-*b*. That is, a UE 115 may determine a time difference, which may be referred to as an offset 320-*b*, between a subframe when PSS, SSS, or CRS or occur in the first timing configuration 305-*b* and the second timing configuration 310-*b*, and the UE 115 may report this offset to the network via a serving cell.

In some cases, a UE 115 may perform a detection sweep to determine other UEs within range. If more than one UE are detected, UE 115 may measure a timing offset for each of the detected UEs. UE 115 may then report each offset to the network via a serving cell. UE may subsequently receive from a base station 105 a measurement configuration, where the measurement configuration may include a measurement gap for each detected UE.

Figure 4:
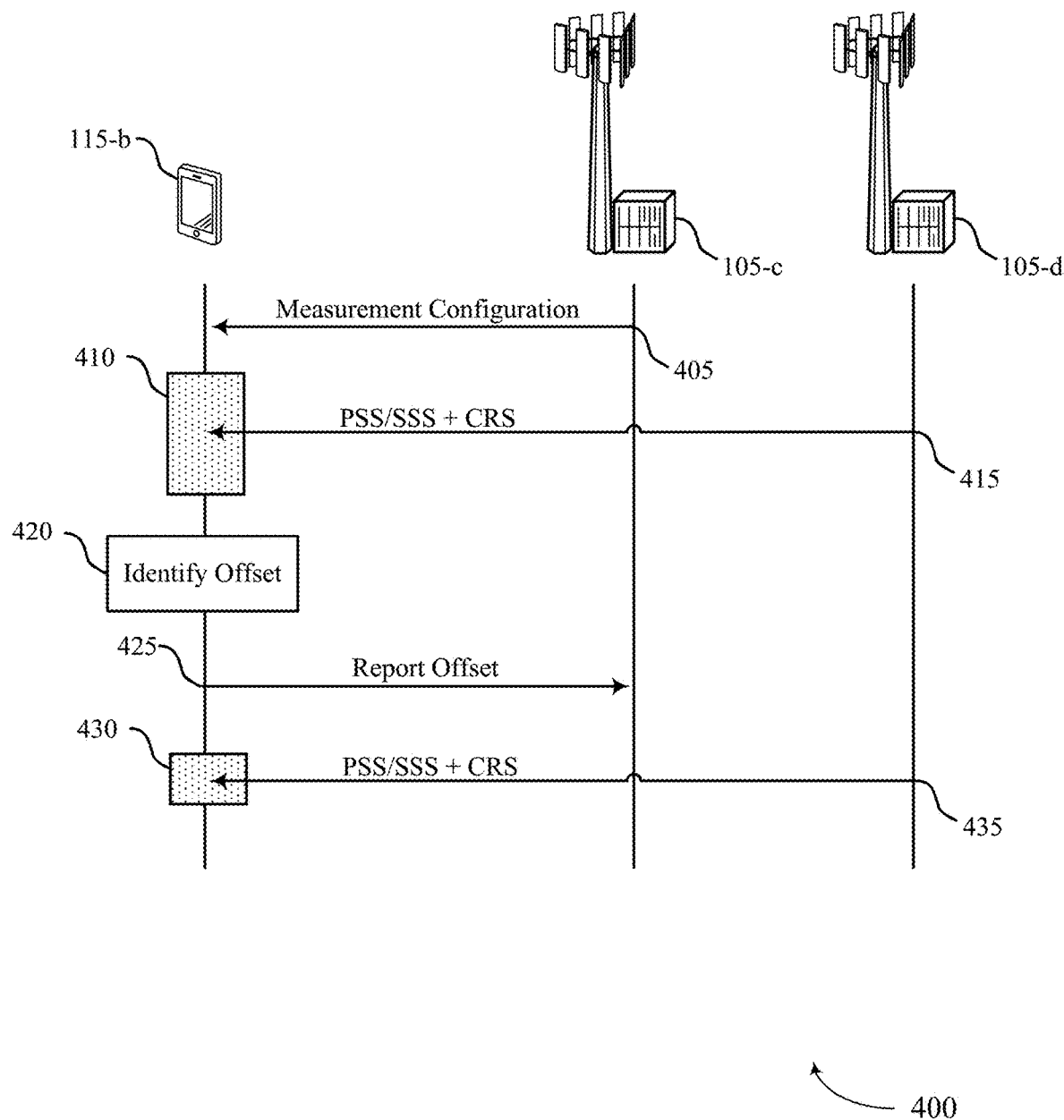
FIG. 4 illustrates an exemplary process flow in a system that supports measurement gap enhancements in accordance with various aspects of the present disclosure.

FIG. 4 illustrates an exemplary process flow 400 in a system that supports measurement gap enhancements in accordance with various aspects of the present disclosure. Process flow 400 may include steps performed by UE 115-*b*, base station 105-*c* and base station 105-*d* which may be examples of a UE 115 and base stations 105 described with reference to FIGS. 1-2.

At 405, base station 105-*c* may transmit a measurement configuration to UE 115-*b*. Thus, base station 105-*c* may send the measurement configuration to UE 115-*b* on a first cell. The measurement configuration may include a first measurement gap for measuring cells in frequency bands different from a first frequency band of the first cell. The UE 115-*b* may receive the measurement configuration over the first cell. At 410, during a first measurement gap defined by the measurement configuration, base station 105-*c* and UE 115-*b* may refrain from communicating.

At 415, UE 115-*b* may tune to another frequency during the first measurement gap to measure signals transmitted by base station 105-*d*. Thus, UE 115-*b* may measure a second cell in a second frequency band during a first measurement interval. The first measurement interval may be based on the first measurement gap (e.g., it may have the same duration as the first measurement gap). In some examples, measuring the second cell includes identifying one or more measurement subframes of the second cell including a synchronization signal or a reference signal, or both.

At 420, UE 115-*b* may identify a timing offset for the subframe timing between base station 105-*c* and base station 105-*d*. That is, UE 115-*b* may identify a timing offset between the first cell the second cell based on measuring the second cell. In some examples, the timing offset includes a difference between a timing of the measurement subframes of the second cell and the measurement subframes of the first cell.

In some cases, UE 115-*b* may also determine that a subframe timing of two or more cells in the second frequency band is synchronized as discussed in connections with FIGS. 3A-3B (e.g., it may compare measurements of more than one cell on the measured frequency band). The second measurement interval may be selected based on the determination of whether (or to what degree) the measured frequency band is synchronized. In some cases, the measured frequency band may not be fully synchronized, but the measurement gap may still be reduced if the timing differences in the frequency band are sufficiently small.

At 425, UE 115-*b* may report the offset to base station 105-*c*. That is, UE 115-*b* may transmit a measurement report to base station 105-*c* based on the measurement configuration. The measurement report may include the timing offset. In some cases, UE 115-*b* may receive a modified measurement configuration from base station 105-*c*. The modified measurement configuration may include a second measurement gap; and the second measurement interval for measurements in the second frequency band may be based on the timing offset. The second measurement interval may be optimized based on the timing offset and have a shorter duration than the first measurement gap. Base station 105-*c* may receive the timing offset from UE 115-*b* for the second cell in the second frequency band based on the measurement configuration. In some cases, base station 105-*c* may receive a second timing offset from a second wireless device; and the second measurement gap may be based on the second timing offset. Base station 105-*c* may thus, in some examples, configure UE 115-*b* with a measurement configuration that is based on the offset information received from the second wireless device.

At 430, base station 105-*c* and UE 115-*b* may refrain from communicating during a second measurement gap. In some cases, base station 105-*c* may determine a second measurement gap for UE 115-*b* based on the received timing offset, and base station 105-*c* may transmit an indication of the second measurement gap to UE 115-*b*. In other cases, UE 115-*b* may autonomously determine the second measurement interval for the second frequency band based on the timing offset (but the measurement gap may remain unchanged). In some examples the second measurement interval has a shorter duration than the first measurement interval and is targeted to the timing of the measurement subframes. In some cases, UE 115-*b* may receive an indication from the first cell that the second frequency band is synchronized, and the determination that the second frequency band is synchronized may be based on the indication. Thus, base station 105-*c* may refrain from communicating with UE 115-*b* for a duration based on the second measurement gap.

At 435, UE 115-*b* may tune to another frequency during the second measurement gap to measure signals transmitted by base station 105-*d*. UE 115-*b* may measure the second cell during the second measurement interval based on the modified measurement configuration or a second measurement interval. In some cases (e.g., if the measurement gap is not reduced) UE 115-*b* may power down a radio component during a portion of the duration of the measurement gap.

Figure 5:
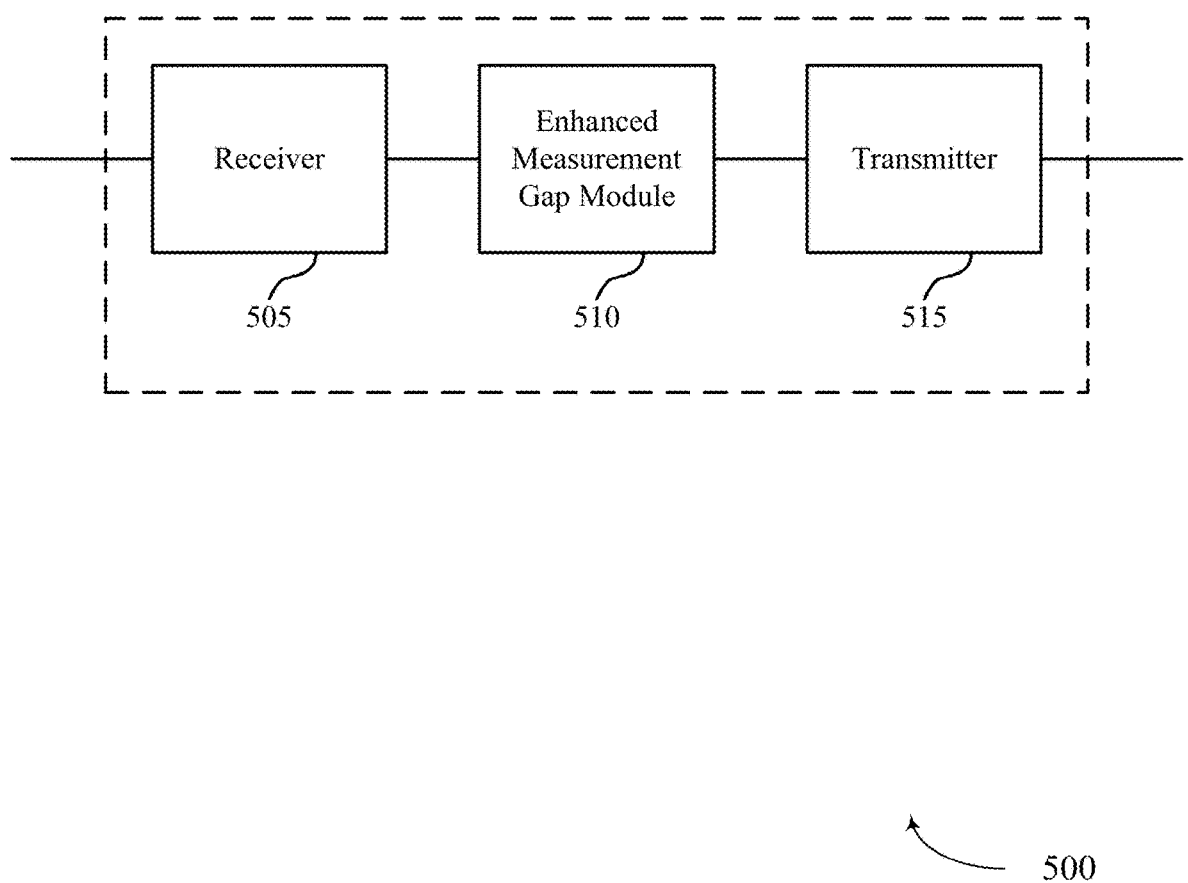
FIGS. 5-7 show block diagrams of a wireless device or devices that support measurement gap enhancements in accordance with various aspects of the present disclosure.

FIG. 5 shows a block diagram of a wireless device 500 that supports measurement gap enhancements in accordance with various aspects of the present disclosure. Wireless device 500 may be an example of aspects of a UE 115 described with reference to FIGS. 1-4. Wireless device 500 may include a receiver 505, an enhanced measurement gap module 510, or a transmitter 515. Wireless device 500 may also include a processor. Each of these components may be in communication with one another.

The receiver 505 may receive information such as packets, user data, or control information associated with various information channels (e.g., control channels, data channels, and information related to measurement gap enhancements, etc.). Information may be passed on to the enhanced measurement gap module 510, and to other components of wireless device 500.

The enhanced measurement gap module 510 may receive a measurement configuration for a first cell in a first frequency band. The measurement configuration may include a first measurement gap for measuring cells in frequency bands different from the first frequency band. The enhanced measurement gap module 510 may measure a second cell in a second frequency band during a first measurement interval; the first measurement interval may be based on the first measurement gap. The enhanced measurement gap module 510 may also identify a timing offset between the first cell the second cell based on measuring the second cell; and it may determine a second measurement interval for the second frequency band based on the timing offset.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
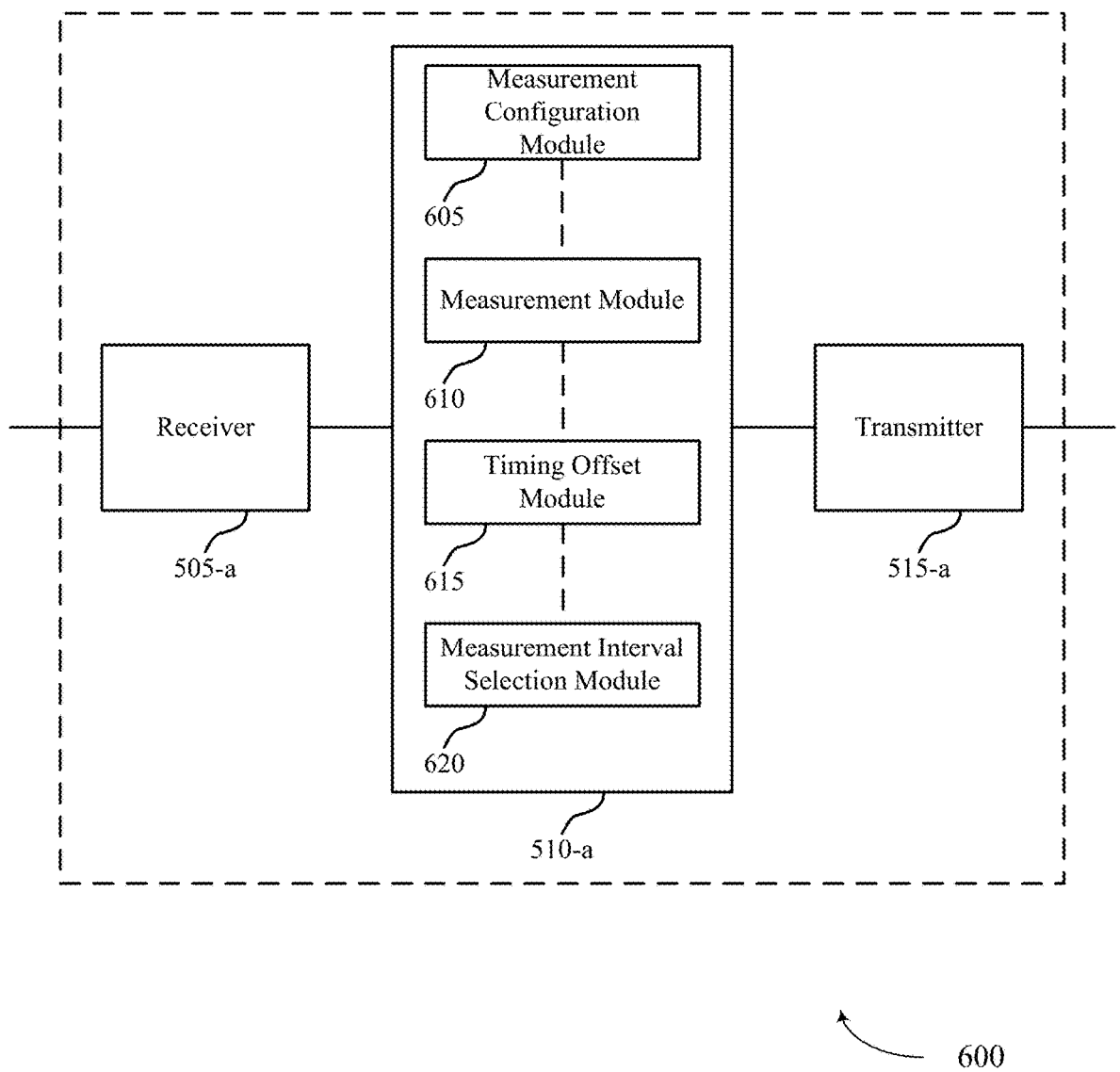

FIG. 6 shows a block diagram of a wireless device 600 that supports measurement gap enhancements in accordance with various aspects of the present disclosure. Wireless device 600 may be an example of aspects of a wireless device 500 or a UE 115 described with reference to FIGS. 1-5. Wireless device 600 may include a receiver 505-*a*, an enhanced measurement gap module 510-*a*, or a transmitter 515-*a*. Wireless device 600 may also include a processor. Each of these components may be in communication with one another. The enhanced measurement gap module 510-*a* may also include a measurement configuration module 605, a measurement module 610, a timing offset module 615, and a measurement interval selection module 620.

The receiver 505-*a* may receive information which may be passed on to enhanced measurement gap module 510-*a*, and to other components of wireless device 600. The enhanced measurement gap module 510-*a* may perform the operations described with reference to FIG. 5. The transmitter 515-*a* may transmit signals received from other components of wireless device 600.

The measurement configuration module 605 may receive a measurement configuration on a first cell in a first frequency band as described with reference to FIGS. 2-4. The measurement configuration module 605 may also receive a modified measurement configuration from the first cell. The modified measurement configuration may include a second measurement gap, and the second measurement interval may be based on the reduced measurement gap. The measurement configuration module 605 may also determine a second measurement gap for the wireless device based on the received timing offset.

The measurement module 610 may measure a second cell in a second frequency band during a first measurement interval as described with reference to FIGS. 2-4. In some examples, measuring the second cell includes identifying measurement subframes of the second cell that include a synchronization signal or a reference signal, or both. In some examples, the timing offset includes a difference between a timing of the measurement subframes of the second cell and measurement subframes of the first cell. The measurement module 610 may also measure the second cell during the second measurement interval based on the modified measurement configuration. In some examples, the measurement module 610 may measure the second cell during the second measurement interval based on the first measurement gap, and a duration of the second measurement interval may be less than a duration of the first measurement gap.

The timing offset module 615 may identify a timing offset between the first cell the second cell based on measuring the second cell as described with reference to FIGS. 2-4.

The measurement interval selection module 620 may select or determine a second measurement interval for the second frequency band based on the timing offset as described with reference to FIGS. 2-4. In some examples, the second measurement interval has a shorter duration than the first measurement interval.

Figure 7:
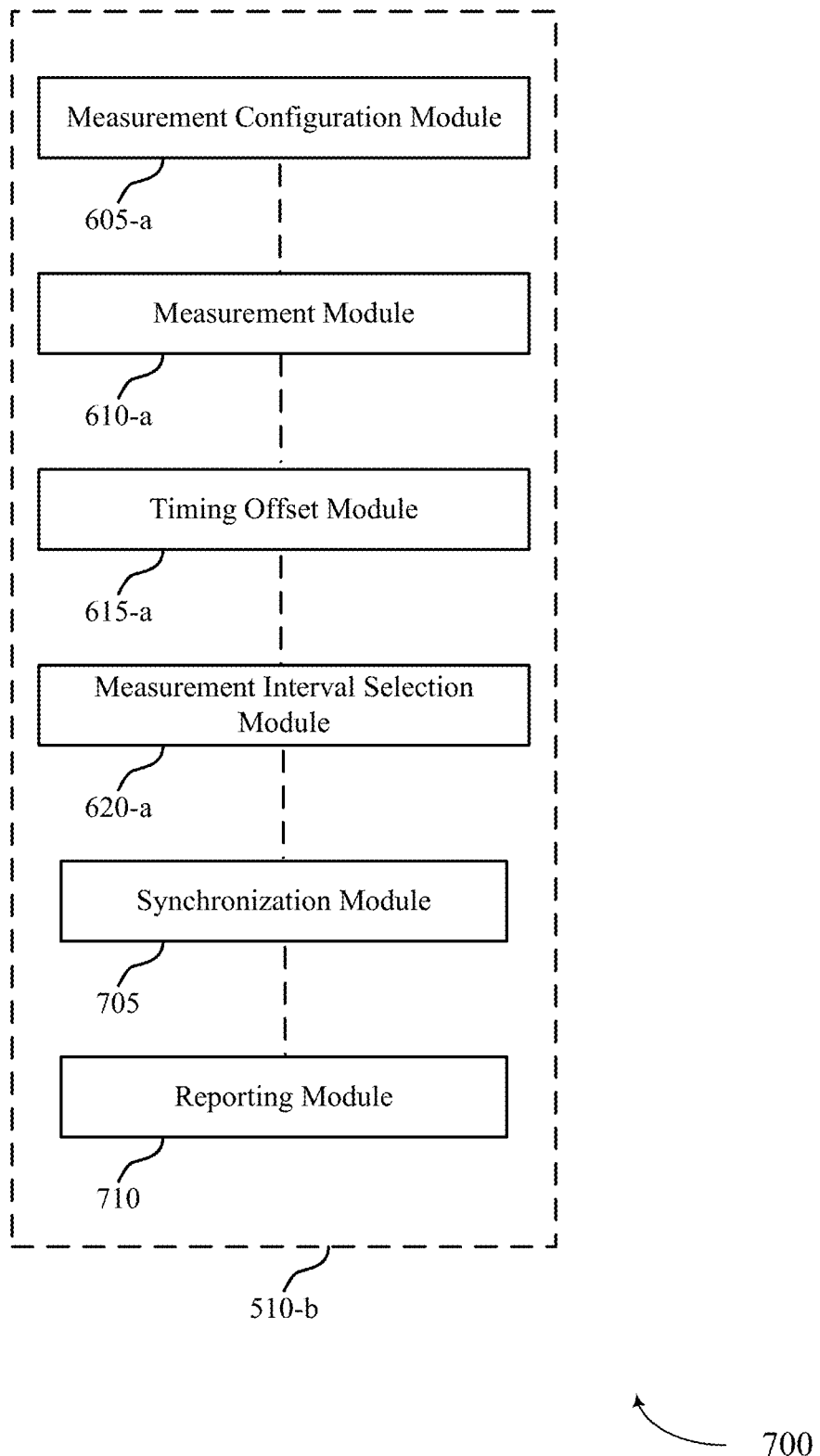

FIG. 7 shows a block diagram 700 of an enhanced measurement gap module 510-*b*, which may be a component of a wireless device 500 or a wireless device 600, and which may support measurement gap enhancements in accordance with various aspects of the present disclosure. The enhanced measurement gap module 510-*b* may be an example of aspects of an enhanced measurement gap module 510 described with reference to FIG. 5 or 6. The enhanced measurement gap module 510-*b* may include a measurement configuration module 605-*a*, a measurement module 610-*a*, a timing offset module 615-*a*, and a measurement interval selection module 620-*a*. Each of these modules may perform the functions described with reference to FIG. 6. The enhanced measurement gap module 510-*b* may also include a synchronization module 705, and a reporting module 710.

The synchronization module 705 may determine that the second frequency band is synchronized based on the timing offset, and the second measurement interval may be determined based on the determination that the second frequency band is synchronized, as described with reference to FIGS. 2-4. The synchronization module 705 may also receive an indication from the first cell that the second frequency band is synchronized; the determination that the second frequency band is synchronized may be based on the indication.

The reporting module 710 may transmit a measurement report to the first cell based on the measurement configuration, and the measurement report may include the timing offset as described with reference to FIGS. 2-4.

Figure 8:
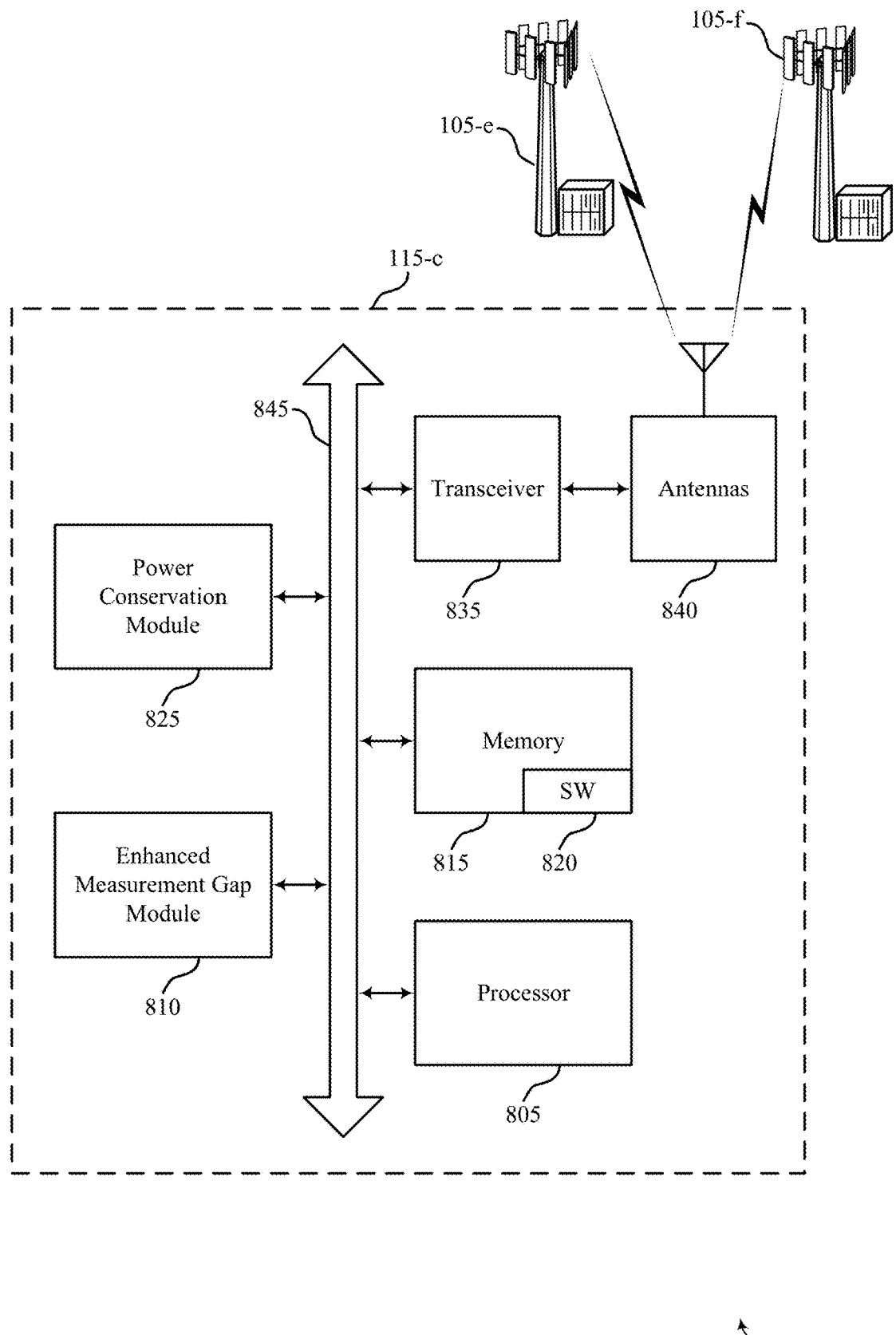
FIG. 8 illustrates a block diagram of a system, including a user equipment (UE), that supports measurement gap enhancements in accordance with various aspects of the present disclosure.

FIG. 8 shows a diagram of a system 800 including a UE 115 that supports measurement gap enhancements in accordance with various aspects of the present disclosure. System 800 may include UE 115-*c*, which may be an example of a wireless device 500, a wireless device 600, or a UE 115 described with reference to FIGS. 1, 2, and 5-7. UE 115-*c* may include an enhanced measurement gap module 810, which may be an example of an enhanced measurement gap module 510 described with reference to FIGS. 5-7. UE 115-*c* may also include a power conservation module 825. UE 115-c may also include components for bi-directional voice and data communications including components for transmitting communications and components for receiving communications. For example, UE 115-c may communicate bi-directionally with base station 105-e or base station 105-f.

The power conservation module 825 may power down, or direct the UE 115-e to power down, one or more radio components during a portion of the duration of the first measurement gap as described with reference to FIGS. 2-4.

UE 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., measurement gap enhancements, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
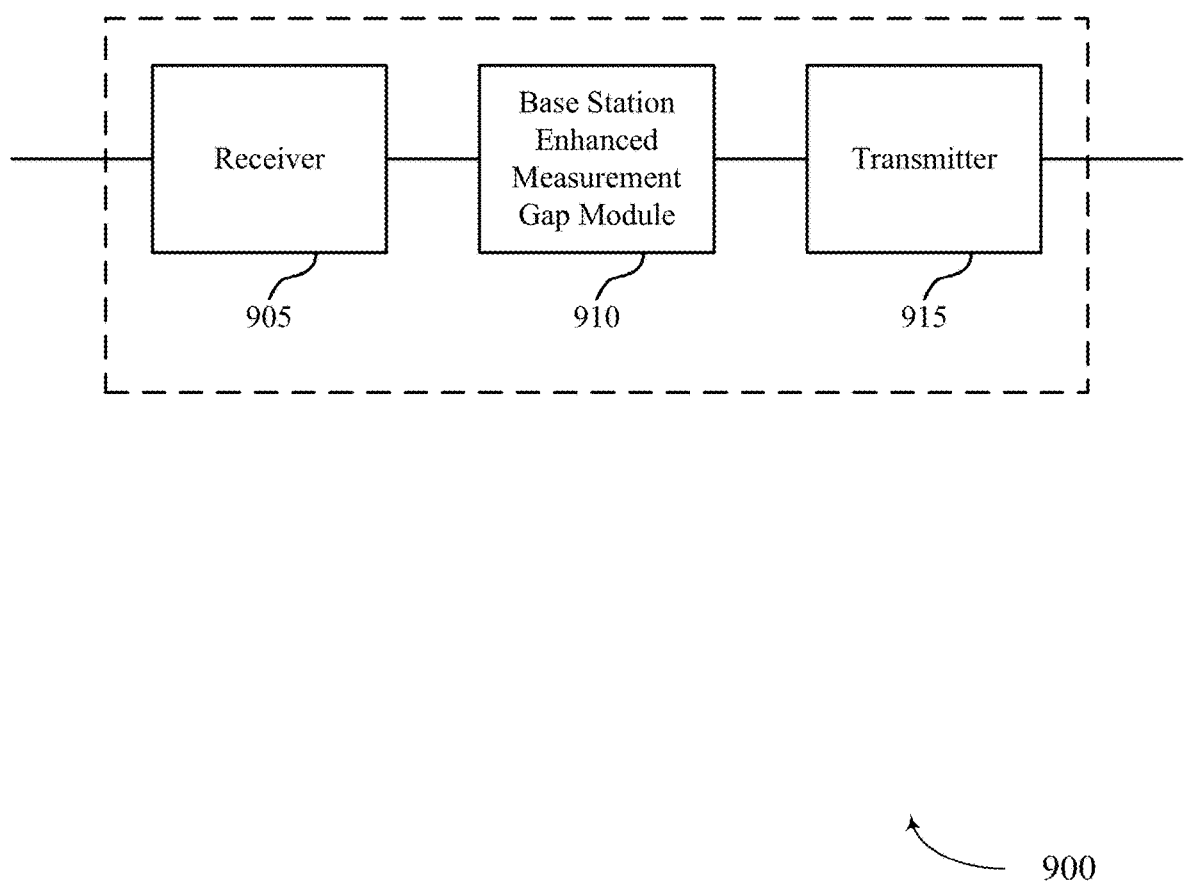
FIGS. 9-11 show block diagrams of a wireless device or devices that support measurement gap enhancements in accordance with various aspects of the present disclosure.

FIG. 9 shows a block diagram of a wireless device 900 that supports measurement gap enhancements in accordance with various aspects of the present disclosure. Wireless device 900 may be an example of aspects of a base station 105 described with reference to FIGS. 1-8. Wireless device 900 may include a receiver 905, a base station enhanced measurement gap module 910, or a transmitter 915. Wireless device 900 may also include a processor. Each of these components may be in communication with one another.

The receiver 905 may receive information such as packets, user data, or control information associated with various information channels (e.g., control channels, data channels, and information related to measurement gap enhancements, etc.). Information may be passed on to the base station enhanced measurement gap module 910, and to other components of wireless device 900.

The base station enhanced measurement gap module 910 may configure a wireless device with a measurement configuration in a first frequency band, and the measurement configuration may include a first measurement gap for measuring cells in frequency bands different from the first frequency band. The base station enhanced measurement gap module 910 may receive a timing offset from the wireless device for a cell in a second frequency band based on the measurement configuration. The base station enhanced measurement gap module 910 may also determine a second measurement gap for the wireless device based on the received timing offset, and it may transmit an indication of the second measurement gap to the wireless device.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas. In some examples, the transmitter 915 may transmit an indication of the second measurement gap to the wireless device.

Figure 10:
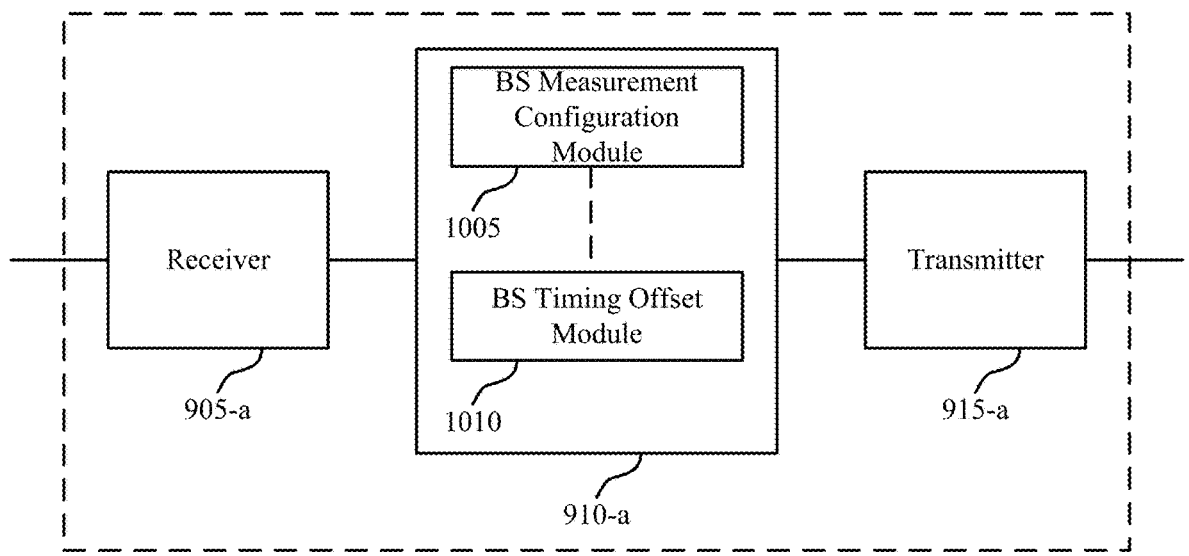

FIG. 10 shows a block diagram of a wireless device 1000 that supports measurement gap enhancements in accordance with various aspects of the present disclosure. Wireless device 1000 may be an example of aspects of a wireless device 900 or a base station 105 described with reference to FIGS. 1-9. Wireless device 1000 may include a receiver 905-a, a base station enhanced measurement gap module 910-a, or a transmitter 915-a. Wireless device 1000 may also include a processor. Each of these components may be in communication with one another. The base station enhanced measurement gap module 910-a may also include a BS measurement configuration module 1005, and a BS timing offset module 1010.

The receiver 905-a may receive information which may be passed on to base station enhanced measurement gap module 910-a, and to other components of wireless device 1000. The base station enhanced measurement gap module 910-a may perform the operations described with reference to FIG. 9. The transmitter 915-a may transmit signals received from other components of wireless device 1000.

The BS measurement configuration module 1005 may configure a wireless device with a measurement configuration in a first frequency band, and the measurement configuration may include a first measurement gap for measuring cells in frequency bands different from the first frequency band as described with reference to FIGS. 2-4.

The BS timing offset module 1010 may receive a timing offset from the wireless device for a cell in a second frequency band based on the measurement configuration as described with reference to FIGS. 2-4.

Figure 11:
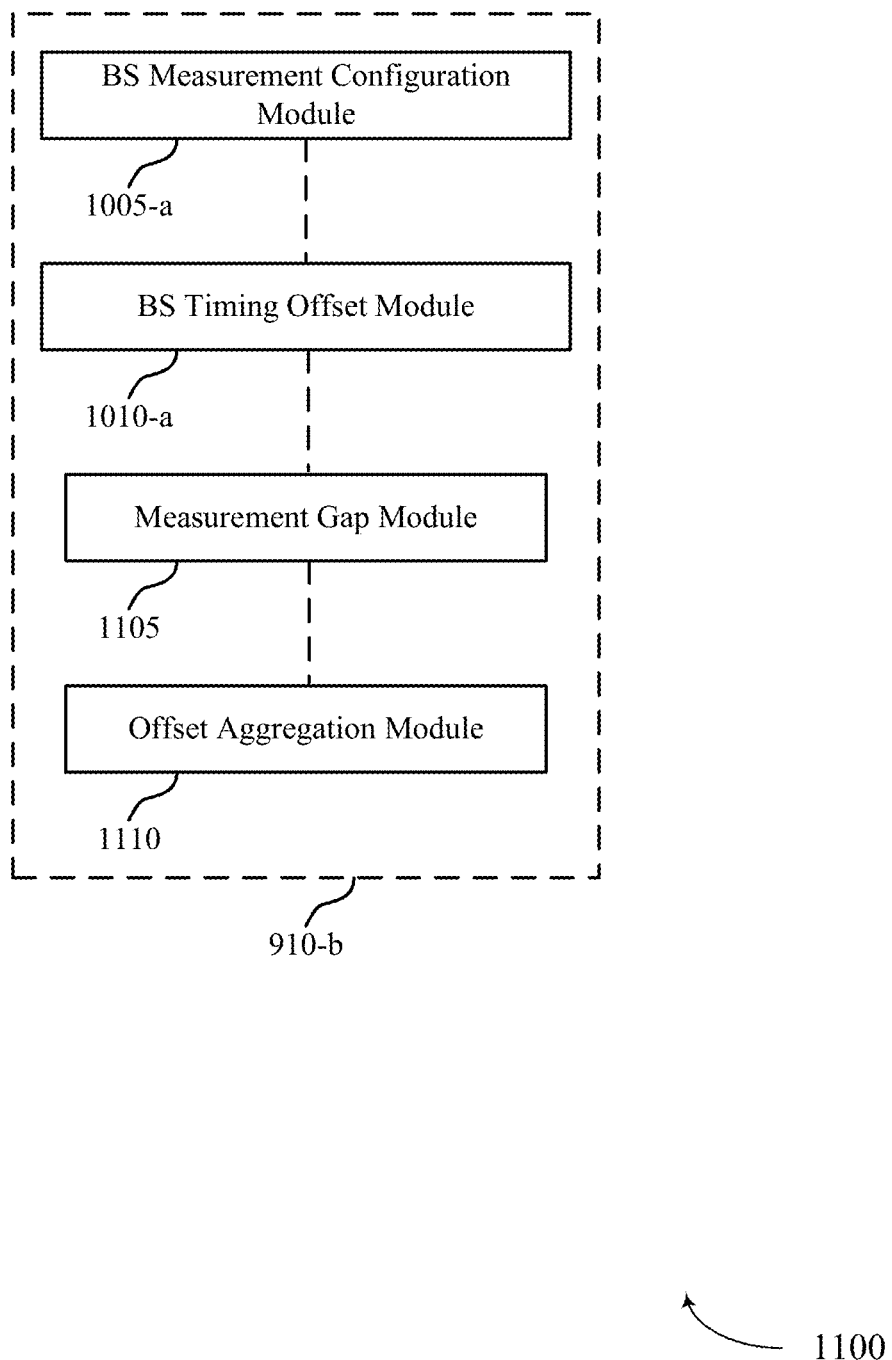

FIG. 11 shows a block diagram 1100 of a base station enhanced measurement gap module 910-b which may be a component of a wireless device 900 or a wireless device 1000, and which may support measurement gap enhancements in accordance with various aspects of the present disclosure. The base station enhanced measurement gap module 910-b may be an example of aspects of a base station enhanced measurement gap module 910 described with reference to FIGS. 9-10. The base station enhanced measurement gap module 910-b may include a BS measurement configuration module 1005-a, and a BS timing offset module 1010-a. Each of these modules may perform the functions described with reference to FIG. 10. The base station enhanced measurement gap module 910-b may also include a measurement gap module 1105, and an offset aggregation module 1110.

The measurement gap module 1105 may refrain from communicating with the wireless device for a duration based on the second measurement gap as described with reference to FIGS. 2-4.

The offset aggregation module 1110 may receive a second timing offset from a second wireless device, and the reduced measurement gap may be based on the second timing offset as described with reference to FIGS. 2-4.

Figure 12:
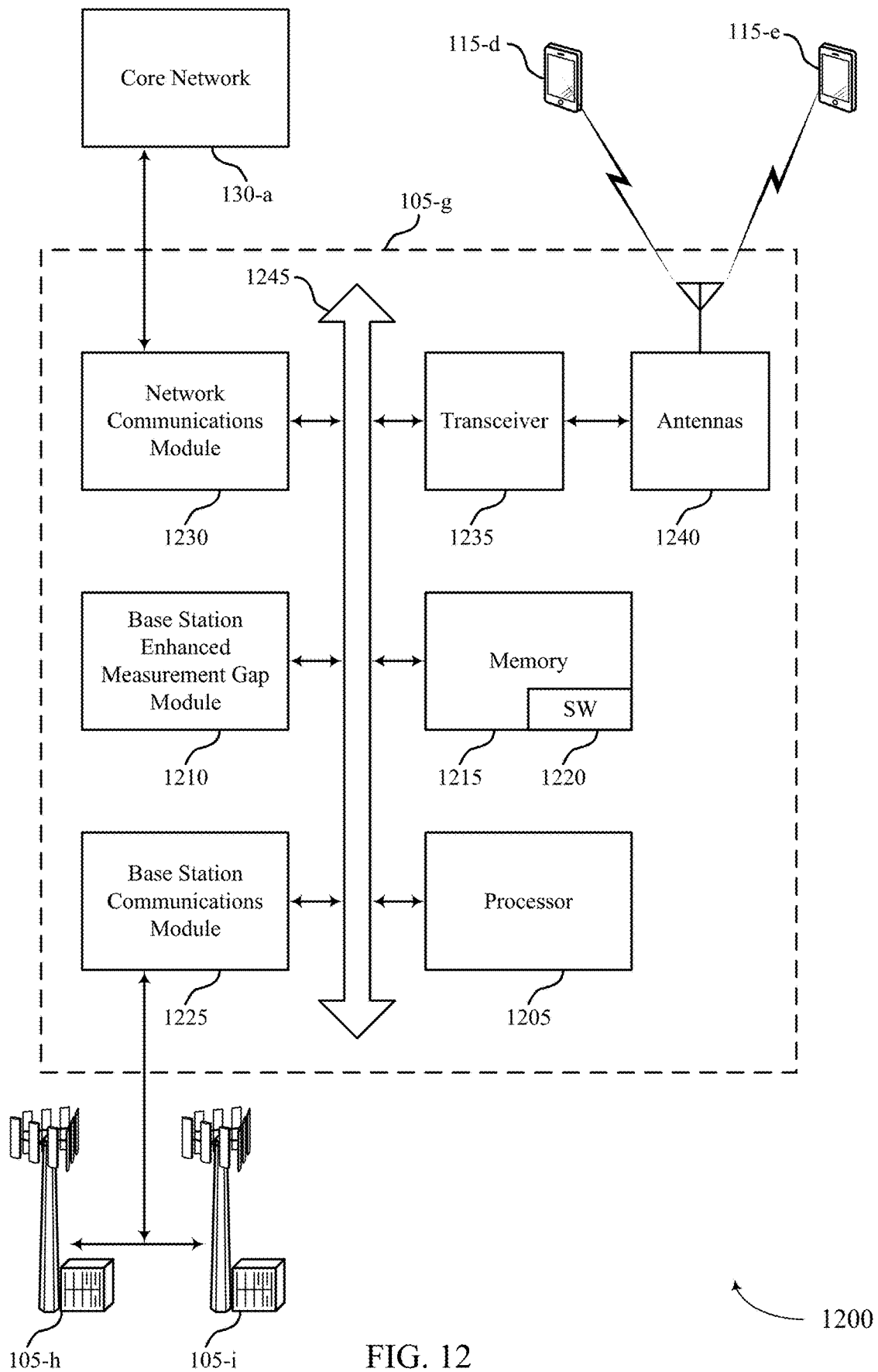
FIG. 12 illustrates a block diagram of a system, including a base station, that supports measurement gap enhancements in accordance with various aspects of the present disclosure.

FIG. 12 shows a diagram of a system 1200 including a base station 105 that supports measurement gap enhancements in accordance with various aspects of the present disclosure. System 1200 may include base station 105-g, which may be an example of a wireless device 900, a wireless device 1000, or a base station 105 described with reference to FIGS. 1, 2, and 9-11. Base Station 105-*g* may include a base station enhanced measurement gap module 1210, which may be an example of a base station enhanced measurement gap module 910 described with reference to FIGS. 9-11. Base Station 105-*g* may also include components for bi-directional voice and data communications including components for transmitting communications and components for receiving communications. For example, base station 105-*g* may communicate bi-directionally with UE 115-*d* or UE 115-*e*.

In some cases, base station 105-*g* may have one or more wired backhaul links. Base station 105-*g* may have a wired backhaul link (e.g., S1 interface, etc.) to the core network 130. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communication module 1225. In some examples, base station communication module 1225 may provide an X2 interface within an LTE/LTE-A wireless communication network technology to provide communication between some of the base stations 105. In some examples, base station 105-*g* may communicate with other base stations through core network 130. In some cases, base station 105-*g* may communicate with the core network 130 through network communications module 1230.

The base station 105-*g* may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-*g*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*g* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., measurement gap enhancements, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSP)s, and the like.

The base station communication module 1225 may manage communications with other base stations 105. In some cases, a communications management module may include a controller or scheduler for controlling communications with UEs 115 in cooperation with other base stations 105. For example, the base station communication module 1225 may coordinate scheduling for transmissions to UEs 115 for various interference mitigation techniques such as beamforming or joint transmission.

The components of wireless device 500, wireless device 600, enhanced measurement gap module 510, system 800, wireless device 900, wireless device 1000, base station enhanced measurement gap module 910, and system 1200 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
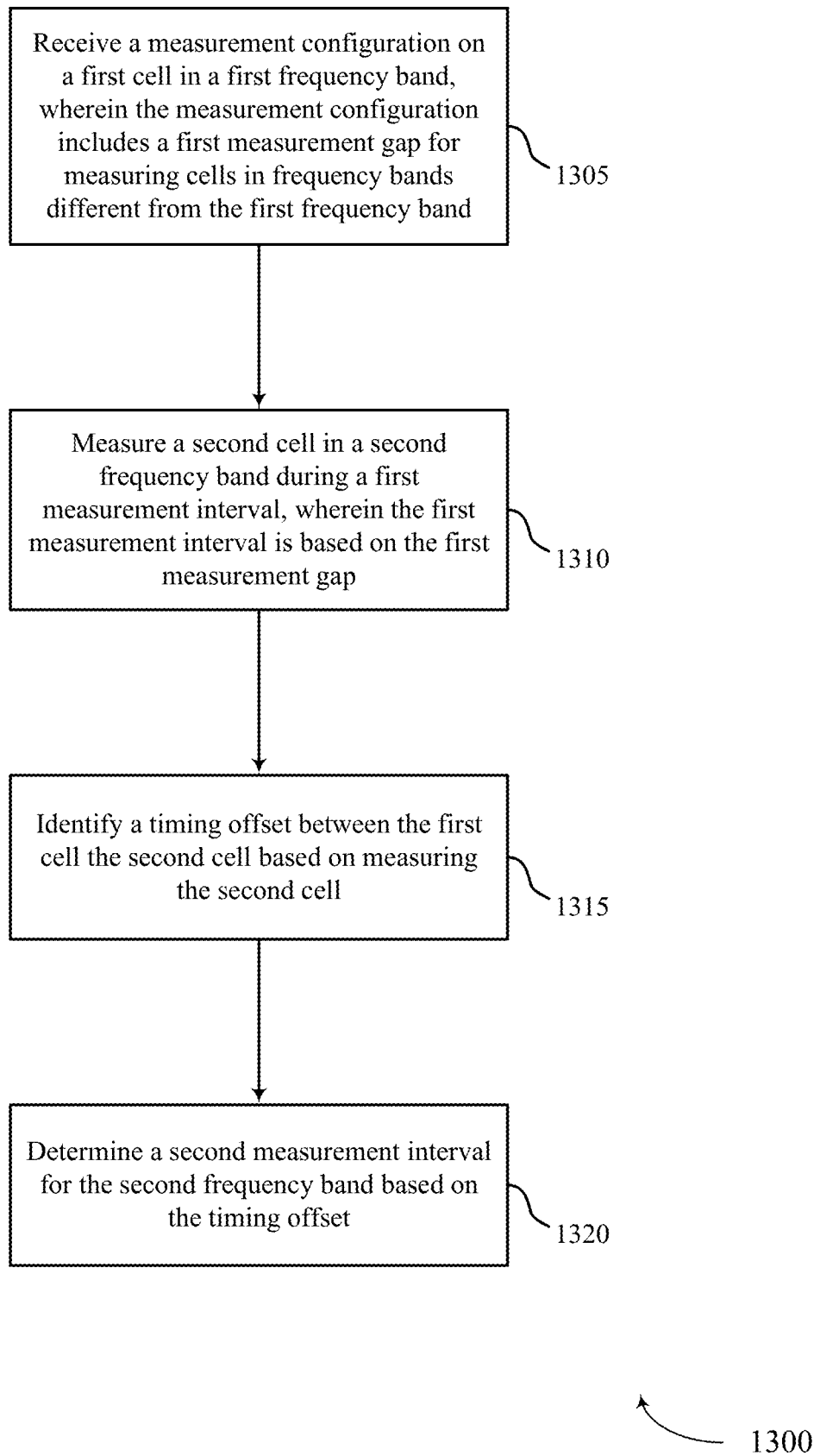
FIGS. 13-17 illustrate methods for measurement gap enhancements in accordance with various aspects of the present disclosure.

FIG. 13 shows a flowchart illustrating a method 1300 for measurement gap enhancements in accordance with various aspects of the present disclosure. The operations of method 1300 may be implemented by a UE 115 or its components as described with reference to FIGS. 1-12. For example, the operations of method 1300 may be performed by the enhanced measurement gap module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive a measurement configuration on a first cell in a first frequency band, where the measurement configuration may include a first measurement gap for measuring cells in frequency bands different from the first frequency band as described with reference to FIGS. 2-4. In certain examples, the operations of block 1305 may be performed by the measurement configuration module 605 as described with reference to FIG. 6.

At block 1310, the UE 115 may measure a second cell in a second frequency band during a first measurement interval, where the first measurement interval may be based on the first measurement gap as described with reference to FIGS. 2-4. In certain examples, the operations of block 1310 may be performed by the measurement module 610 as described with reference to FIG. 6.

At block 1315, the UE 115 may identify a timing offset between the first cell the second cell based on measuring the second cell as described with reference to FIGS. 2-4. In certain examples, the operations of block 1315 may be performed by the timing offset module 615 as described with reference to FIG. 6.

At block 1320, the UE 115 may select or determine a second measurement interval for the second frequency band based on the timing offset as described with reference to FIGS. 2-4. In certain examples, the operations of block 1320 may be performed by the measurement interval selection module 620 as described with reference to FIG. 6.

Figure 14:
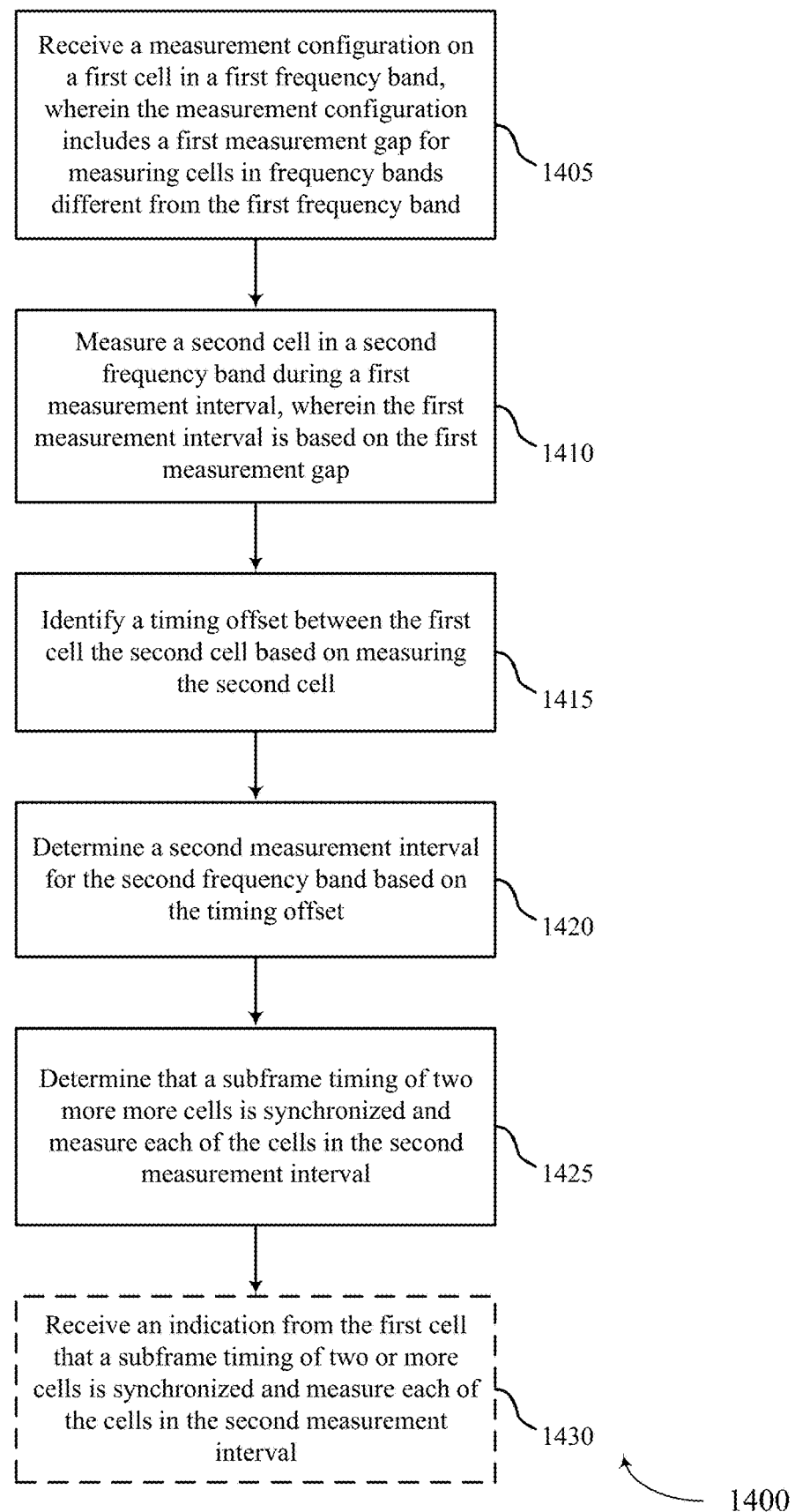

FIG. 14 shows a flowchart illustrating a method 1400 for measurement gap enhancements in accordance with various aspects of the present disclosure. The operations of method 1400 may be implemented by a UE 115 or its components as described with reference to FIGS. 1-12. For example, the operations of method 1400 may be performed by the enhanced measurement gap module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may receive a measurement configuration on a first cell in a first frequency band, and the measurement configuration may include a first measurement gap for measuring cells in frequency bands different from the first frequency band as described with reference to FIGS. 2-4. In certain examples, the operations of block 1405 may be performed by the measurement configuration module 605 as described with reference to FIG. 6.

At block 1410, the UE 115 may measure a second cell in a second frequency band during a first measurement interval, where the first measurement interval may be based on the first measurement gap as described with reference to FIGS. 2-4. In certain examples, the operations of block 1410 may be performed by the measurement module 610 as described with reference to FIG. 6.

At block 1415, the UE 115 may identify a timing offset between the first cell the second cell based on measuring the second cell as described with reference to FIGS. 2-4. In certain examples, the operations of block 1415 may be performed by the timing offset module 615 as described with reference to FIG. 6.

At block 1420, the UE 115 may select or determine a second measurement interval for the second frequency band based on the timing offset as described with reference to FIGS. 2-4. In certain examples, the operations of block 1420 may be performed by the measurement interval selection module 620 as described with reference to FIG. 6.

At block 1425, the UE 115 may determine that a subframe timing of two or more cells in the second frequency band is synchronized and may measure each of the two or more cells in the second measurement interval. In certain examples, the operations of block 1425 may be performed by the synchronization module 705 as described with reference to FIG. 7.

At block 1430, the UE 115 may optionally receive an indication from the first cell that a subframe of two or more cells in the second frequency band is synchronized and may measure each of the two or more cells in the second measurement interval In certain examples, the operations of block 1430 may be performed by the synchronization module 705 as described with reference to FIG. 7.

Figure 15:
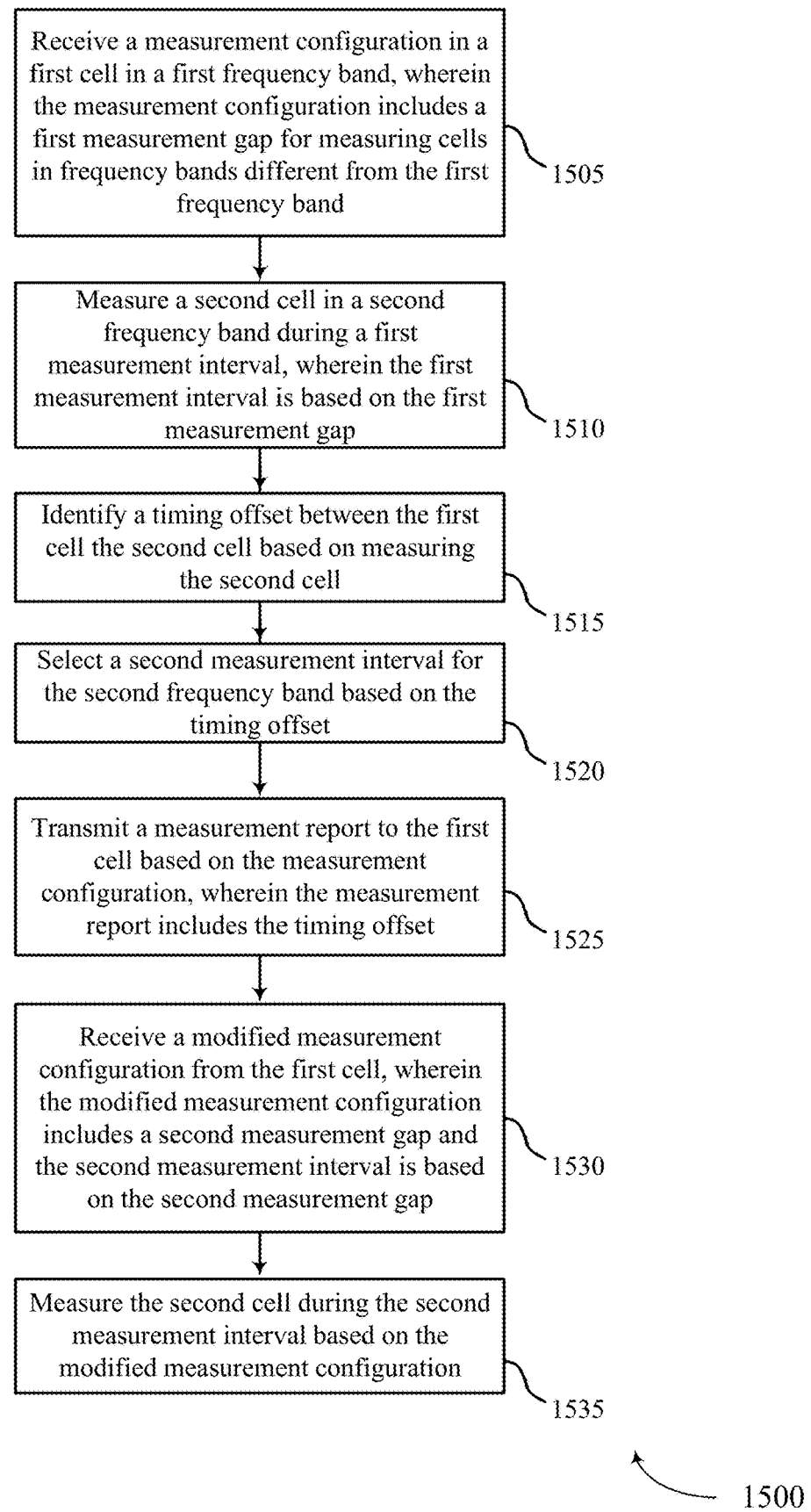

FIG. 15 shows a flowchart illustrating a method 1500 for measurement gap enhancements in accordance with various aspects of the present disclosure. The operations of method 1500 may be implemented by a UE 115 or its components as described with reference to FIGS. 1-12. For example, the operations of method 1500 may be performed by the enhanced measurement gap module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may receive a measurement configuration on a first cell in a first frequency band, where the measurement configuration may include a first measurement gap for measuring cells in frequency bands different from the first frequency band as described with reference to FIGS. 2-4. In certain examples, the operations of block 1505 may be performed by the measurement configuration module 605 as described with reference to FIG. 6.

At block 1510, the UE 115 may measure a second cell in a second frequency band during a first measurement interval, where the first measurement interval may be based on the first measurement gap as described with reference to FIGS. 2-4. In certain examples, the operations of block 1510 may be performed by the measurement module 610 as described with reference to FIG. 6.

At block 1515, the UE 115 may identify a timing offset between the first cell the second cell based on measuring the second cell as described with reference to FIGS. 2-4. In certain examples, the operations of block 1515 may be performed by the timing offset module 615 as described with reference to FIG. 6.

At block 1520, the UE 115 may select or determine a second measurement interval for the second frequency band based on the timing offset as described with reference to FIGS. 2-4. In certain examples, the operations of block 1520 may be performed by the measurement interval selection module 620 as described with reference to FIG. 6.

At block 1525, the UE 115 may transmit a measurement report to the first cell based on the measurement configuration, where the measurement report may include the timing offset as described with reference to FIGS. 2-4. In certain examples, the operations of block 1525 may be performed by the reporting module 710 as described with reference to FIG. 7.

At block 1530, the UE 115 may receive a modified measurement configuration from the first cell, where the modified measurement configuration may include a second measurement gap and the second measurement interval may be based on the reduced measurement gap as described with reference to FIGS. 2-4. In certain examples, the operations of block 1530 may be performed by the measurement configuration module 605 as described with reference to FIG. 6.

At block 1535, the UE 115 may measure the second cell during the second measurement interval based on the modified measurement configuration as described with reference to FIGS. 2-4. In certain examples, the operations of block 1535 may be performed by the measurement module 610 as described with reference to FIG. 6.

Figure 16:
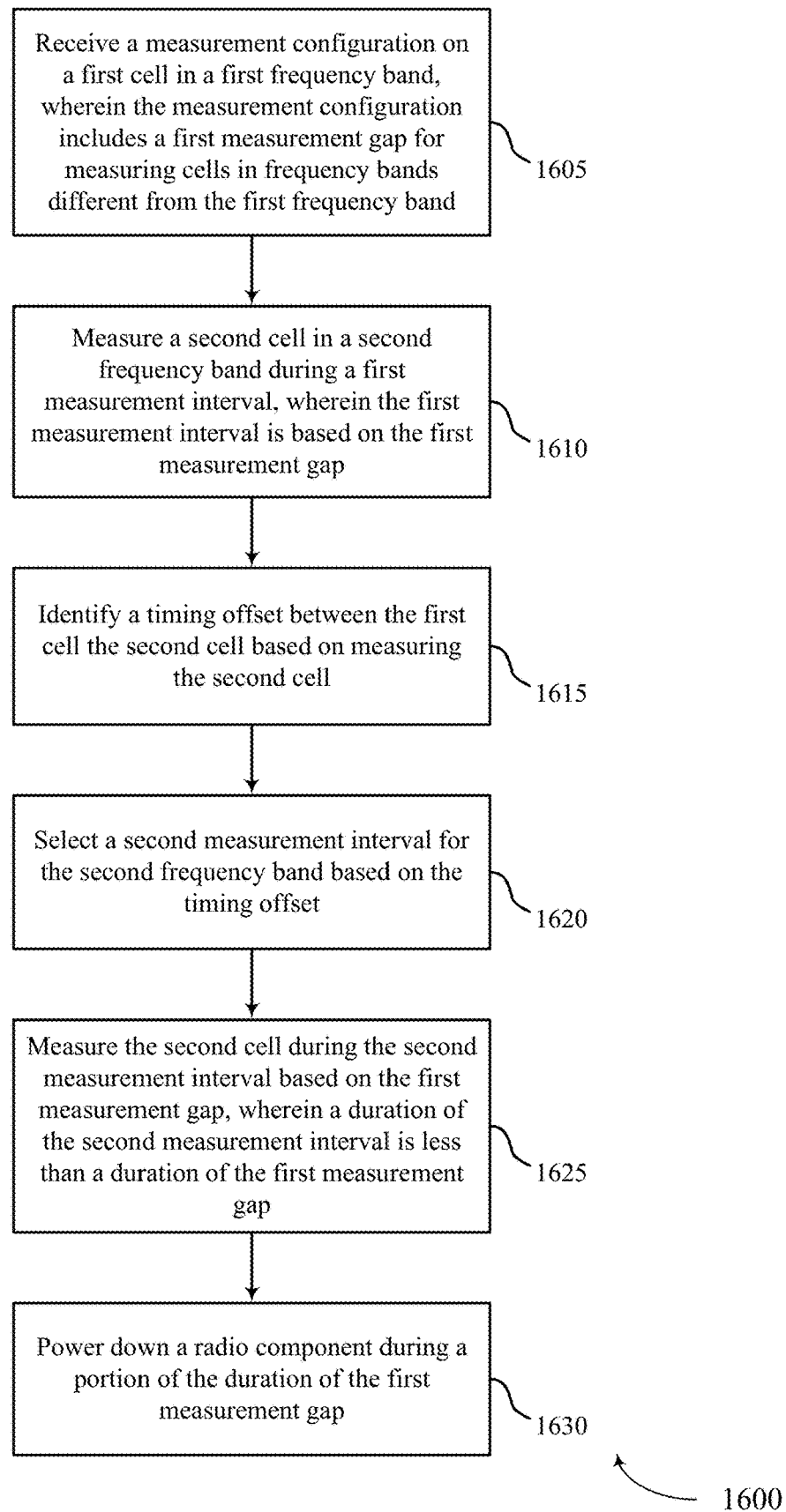

FIG. 16 shows a flowchart illustrating a method 1600 for measurement gap enhancements in accordance with various aspects of the present disclosure. The operations of method 1600 may be implemented by a UE 115 or its components as described with reference to FIGS. 1-12. For example, the operations of method 1600 may be performed by the enhanced measurement gap module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may receive a measurement configuration on a first cell in a first frequency band, where the measurement configuration may include a first measurement gap for measuring cells in frequency bands different from the first frequency band as described with reference to FIGS. 2-4. In certain examples, the operations of block 1605 may be performed by the measurement configuration module 605 as described with reference to FIG. 6.

At block 1610, the UE 115 may measure a second cell in a second frequency band during a first measurement interval, where the first measurement interval may be based on the first measurement gap as described with reference to FIGS. 2-4. In certain examples, the operations of block 1610 may be performed by the measurement module 610 as described with reference to FIG. 6.

At block 1615, the UE 115 may identify a timing offset between the first cell the second cell based on measuring the second cell as described with reference to FIGS. 2-4. In certain examples, the operations of block 1615 may be performed by the timing offset module 615 as described with reference to FIG. 6.

At block 1620, the UE 115 may select or determine a second measurement interval for the second frequency band based on the timing offset as described with reference to FIGS. 2-4. In certain examples, the operations of block 1620 may be performed by the measurement interval selection module 620 as described with reference to FIG. 6.

At block 1625, the UE 115 may measure the second cell during the second measurement interval based on the first measurement gap, where a duration of the second measurement interval may be less than a duration of the first measurement gap as described with reference to FIGS. 2-4. In certain examples, the operations of block 1625 may be performed by the measurement module 610 as described with reference to FIG. 6.

At block 1630, the UE 115 may power down a radio component during a portion of the duration of the first measurement gap as described with reference to FIGS. 2-4. In certain examples, the operations of block 1630 may be performed by the power conservation module 715 as described with reference to FIG. 7.

Figure 17:
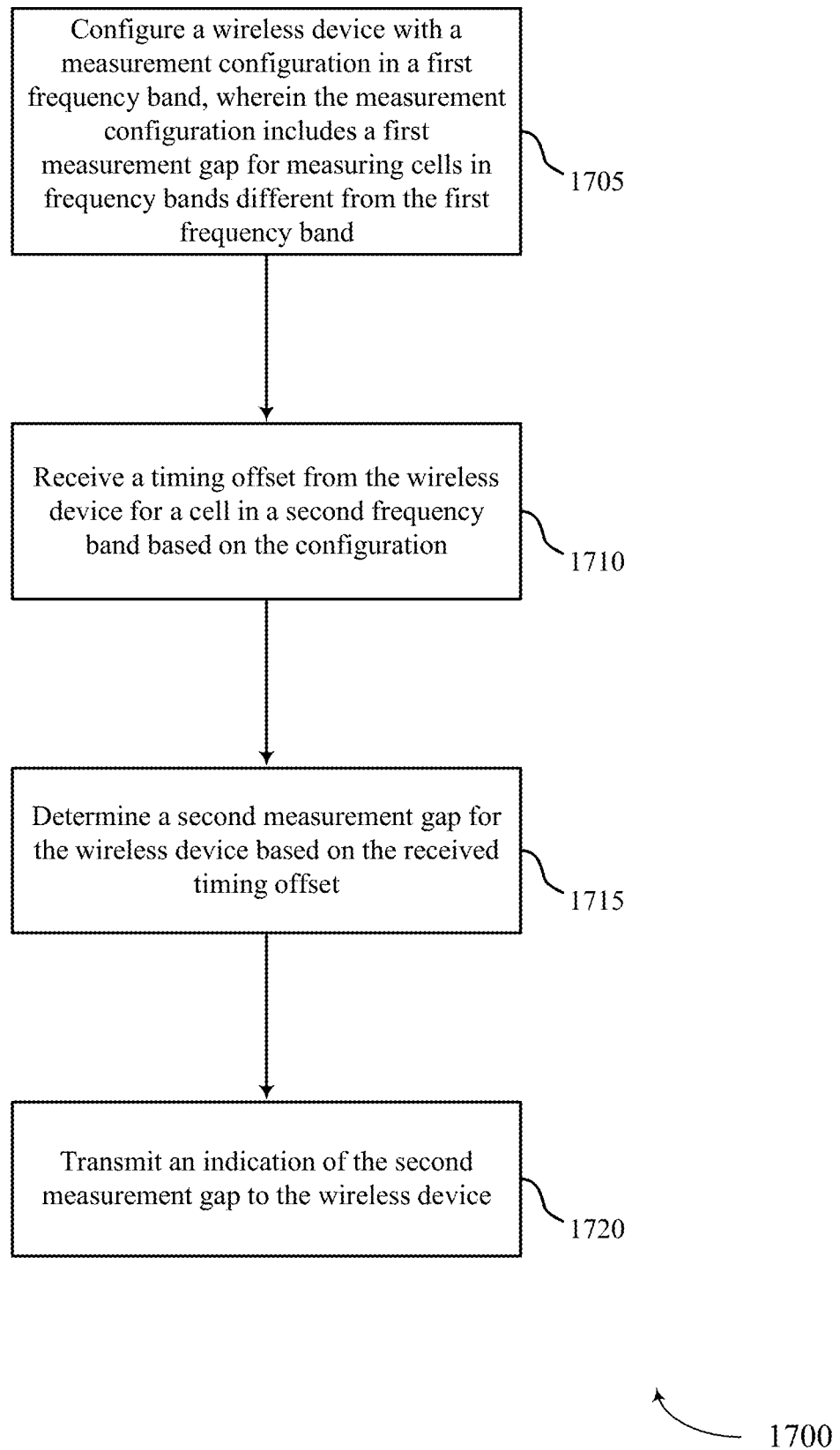

FIG. 17 shows a flowchart illustrating a method 1700 for measurement gap enhancements in accordance with various aspects of the present disclosure. The operations of method 1700 may be implemented by a base station 105 or its components as described with reference to FIGS. 1-12. For example, the operations of method 1700 may be performed by the base station enhanced measurement gap module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1300, 1400, 1500, and 1600 of FIGS. 13-16.

At block 1705, the base station 105 may configure a wireless device with a measurement configuration in a first frequency band, where the measurement configuration may include a first measurement gap for measuring cells in frequency bands different from the first frequency band as described with reference to FIGS. 2-4. In certain examples, the operations of block 1705 may be performed by the BS measurement configuration module 1005 as described with reference to FIG. 10.

At block 1710, the base station 105 may receive a timing offset from the wireless device for a cell in a second frequency band based on the measurement configuration as described with reference to FIGS. 2-4. In certain examples, the operations of block 1710 may be performed by the BS timing offset module 1010 as described with reference to FIG. 10.

At block 1715, the base station 105 may determine a second measurement gap for the wireless device based on the received timing offset as described with reference to FIGS. 2-4. In certain examples, the operations of block 1715 may be performed by the measurement configuration module 605 as described with reference to FIG. 6.

At block 1720, the base station 105 may transmit an indication of the second measurement gap to the wireless device as described with reference to FIGS. 2-4. In certain examples, the operations of block 1720 may be performed by the transmitter 915 as described with reference to FIG. 9.

Thus, methods 1300, 1400, 1500, 1600, and 1700 may provide for measurement gap enhancements. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks or systems, including such networks and systems as described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    receiving a measurement configuration on a first cell in a first frequency band, wherein the measurement configuration comprises a first measurement gap for measuring cells in frequency bands different from the first frequency band;
    measuring a second cell in a second frequency band during a first measurement interval, wherein the first measurement interval is based at least in part on the first measurement gap;
    identifying a timing offset between the first cell and the second cell based at least in part on measuring the second cell;
    transmitting a measurement report to the first cell based at least in part on the measurement configuration, wherein the measurement report comprises the timing offset;
    determining a second measurement interval for the second frequency band; and
    measuring the second cell during the second measurement interval based at least in part on the first measurement gap or a modified measurement configuration.

2. The method of claim 1, wherein the second measurement interval has a shorter duration than the first measurement interval.

3. The method of claim 1, further comprising:
    determining that a subframe timing of two or more cells in the second frequency band is synchronized; and
    measuring each of the two or more cells in the second measurement interval.

4. The method of claim 1, further comprising:
    receiving an indication from the first cell that a subframe timing of two or more cells in the second frequency band is synchronized; and
    measuring each of the two or more cells in the second measurement interval.

5. The method of claim 1, wherein measuring the second cell comprises:
    identifying one or more measurement subframes of the second cell comprising a synchronization signal, a reference signal, or both.

6. The method of claim 5, wherein the timing offset comprises a difference between a timing of the one or more measurement subframes of the second cell and one or more measurement subframes of the first cell.

7. The method of claim 1, further comprising:
    receiving the modified measurement configuration from the first cell, wherein the modified measurement configuration comprises a second measurement gap, and wherein the second measurement interval is based at least in part on the second measurement gap.

8. The method of claim 1, wherein a duration of the second measurement interval is less than a duration of the first measurement gap.

9. The method of claim 1, further comprising:
    transmitting an indication of the timing offset to the first cell.

10. The method of claim 1, further comprising:
    powering down a radio component during a portion of the duration of the first measurement gap.

11. An apparatus for wireless communication, comprising:
    means for receiving a measurement configuration on a first cell in a first frequency band, wherein the measurement configuration comprises a first measurement gap for measuring cells in frequency bands different from the first frequency band;
    means for measuring a second cell in a second frequency band during a first measurement interval, wherein the first measurement interval is based at least in part on the first measurement gap;
    means for identifying a timing offset between the first cell and the second cell based at least in part on measuring the second cell;
    means for transmitting a measurement report to the first cell based at least in part on the measurement configuration, wherein the measurement report comprises the timing offset;
    means for determining a second measurement interval for the second frequency; and
    means for measuring the second cell during the second measurement interval based at least in part on the first measurement gap or a modified measurement configuration.

12. The apparatus of claim 11, wherein the second measurement interval has a shorter duration than the first measurement interval.

13. The apparatus of claim 11, further comprising:
means for determining that a subframe timing of two or more cells in the second frequency band is synchronized; and
means for measuring each of the two or more cells in the measurement interval.

14. The apparatus of claim 11, further comprising:
means for receiving an indication from the first cell that a subframe timing of two or more cells in the second frequency band is synchronized; and
means for measuring each of the two or more cells in the second measurement interval.

15. The apparatus of claim 11, wherein the means for measuring the second cell comprises:
means for identifying one or more measurement subframes of the second cell comprising a synchronization signal, a reference signal, or both.

16. The apparatus of claim 15, wherein the timing offset comprises a difference between a timing of the one or more measurement subframes of the second cell and one or more measurement subframes of the first cell.

17. The apparatus of claim 11, further comprising:
means for receiving the modified measurement configuration from the first cell, wherein the modified measurement configuration comprises a second measurement gap, and wherein the second measurement interval is based at least in part on the second measurement gap.

18. The apparatus of claim 11, wherein a duration of the second measurement interval is less than a duration of the first measurement gap.

19. The apparatus of claim 11, further comprising:
means for transmitting an indication of the timing offset to the first cell.

20. The apparatus of claim 11, further comprising:
means for powering down a radio component during a portion of the duration of the first measurement gap.

21. An apparatus for wireless communication, comprising:
a processor;
memory in electronic communication with the processor; and
instructions stored in the memory and operable, when executed by the processor, to cause the apparatus to:
receive a measurement configuration on a first cell in a first frequency band, wherein the measurement configuration comprises a first measurement gap for measuring cells in frequency bands different from the first frequency band;
measure a second cell in a second frequency band during a first measurement interval, wherein the first measurement interval is based at least in part on the first measurement gap;
identify a timing offset between the first cell and the second cell based at least in part on measuring the second cell;
transmit a measurement report to the first cell based at least in part on the measurement configuration, wherein the measurement report comprises the timing offset;
determine a second measurement interval for the second frequency band; and
measure the second cell during the second measurement interval based at least in part on the first measurement gap or a modified measurement configuration.

22. The apparatus of claim 21, wherein the second measurement interval has a shorter duration than the first measurement interval.

23. The apparatus of claim 21, wherein the instructions are operable to cause to the apparatus to:
determine that a subframe timing of two or more cells in the second frequency band is synchronized; and
measure each of the two or more cells in the second measurement interval.

24. The apparatus of claim 21, wherein the instructions are operable to cause to the apparatus to:
receive an indication from the first cell that a subframe timing of two or more cells in the second frequency band is synchronized; and
measure each of the two or more cells in the second measurement interval.

25. The apparatus of claim 21, wherein the instructions are operable to cause to the apparatus to:
identify one or more measurement subframes of the second cell comprising a synchronization signal, a reference signal, or both.

26. The apparatus of claim 25, wherein the timing offset comprises a difference between a timing of the one or more measurement subframes of the second cell and one or more measurement subframes of the first cell.

27. The apparatus of claim 21, wherein the instructions are operable to cause to the apparatus to:
receive the modified measurement configuration from the first cell, wherein the modified measurement configuration comprises a second measurement gap, and wherein the second measurement interval is based at least in part on the second measurement gap.

28. The apparatus of claim 21, wherein a duration of the second measurement interval is less than a duration of the first measurement gap.

29. The apparatus of claim 21, wherein the instructions are operable to cause the apparatus to:
transmit an indication of the timing offset to the first cell.

30. The apparatus of claim 21, wherein the instructions are operable to cause to the apparatus to:
power down a radio component during a portion of the duration of the first measurement gap.

31. A non-transitory computer-readable medium storing code for wireless communication, the code comprising instructions executable to:
receive a measurement configuration on a first cell in a first frequency band, wherein the measurement configuration comprises a first measurement gap for measuring cells in frequency bands different from the first frequency band;
measure a second cell in a second frequency band during a first measurement interval, wherein the first measurement interval is based at least in part on the first measurement gap;
identify a timing offset between the first cell and the second cell based at least in part on measuring the second cell;
transmit a measurement report to the first cell based at least in part on the measurement configuration, wherein the measurement report comprises the timing offset;
determine a second measurement interval for the second frequency band; and measure the second cell during the second measurement interval based at least in part on the first measurement gap or a modified measurement configuration.

32. The non-transitory computer-readable medium of claim 31, wherein the second measurement interval has a shorter duration than the first measurement interval.

33. The non-transitory computer-readable medium of claim 31, wherein the instructions are executable to:
determine that a subframe timing of two or more cells in the second frequency band is synchronized; and
measure each of the two or more cells in the second measurement interval.

34. The non-transitory computer-readable medium of claim 31, wherein the instructions are executable to:
receive an indication from the first cell that a second subframe timing of two or more cells in the second frequency band is synchronized; and
measure each of the two or more cells in the second measurement interval.

35. The non-transitory computer-readable medium of claim 31, wherein measuring the second cell comprises:
identifying one or more measurement subframes of the second cell comprising a synchronization signal, a reference signal, or both.

36. The non-transitory computer-readable medium of claim 35, wherein the timing offset comprises a difference between a timing of the one or more measurement subframes of the second cell and one or more measurement subframes of the first cell.

37. The non-transitory computer-readable medium of claim 31, wherein the instructions are executable to:
receive the modified measurement configuration from the first cell, wherein the modified measurement configuration comprises a second measurement gap, and wherein the second measurement interval is based at least in part on the second measurement gap.

38. The non-transitory computer-readable medium of claim 31, wherein a duration of the second measurement interval is less than a duration of the first measurement gap.

39. The non-transitory computer-readable medium of claim 31, wherein the instructions are executable to:
transmit an indication of the timing offset to the first cell.

40. The non-transitory computer-readable medium of claim 31, wherein the instructions are executable to:
power down a radio component during a portion of the duration of the first measurement gap.

* * * * *